United States Patent
Nazer et al.

(10) Patent No.: US 11,636,835 B2
(45) Date of Patent: Apr. 25, 2023

(54) SPOKEN WORDS ANALYZER

(71) Applicant: Spotify AB, Stockholm (SE)

(72) Inventors: Tahora H. Nazer, Tempe, AZ (US);
Tristan Jehan, Brooklyn, NY (US)

(73) Assignee: Spotify AB, Stockholm (SE)

( * ) Notice: Subject to any disclaimer, the term of this patent is extended or adjusted under 35 U.S.C. 154(b) by 198 days.

(21) Appl. No.: 17/003,614

(22) Filed: Aug. 26, 2020

(65) Prior Publication Data

US 2020/0394988 A1    Dec. 17, 2020

Related U.S. Application Data

(63) Continuation of application No. 16/111,614, filed on Aug. 24, 2018, now Pat. No. 10,770,044.

(Continued)

(51) Int. Cl.
| | |
|---|---|
| *G06F 16/60* | (2019.01) |
| *G10H 1/00* | (2006.01) |
| *G10L 15/14* | (2006.01) |
| *G06F 16/438* | (2019.01) |
| *G06N 7/00* | (2023.01) |

(Continued)

(52) U.S. Cl.
CPC ....... *G10H 1/0008* (2013.01); *G06F 16/4387* (2019.01); *G06F 16/685* (2019.01); *G06F 16/686* (2019.01); *G06F 17/18* (2013.01); *G06F 40/242* (2020.01); *G06F 40/279* (2020.01); *G06F 40/30* (2020.01); *G06N 7/005* (2013.01); *G06N 20/00* (2019.01); *G06N 20/20* (2019.01); *G10L 15/14* (2013.01); *G06N 5/003* (2013.01); *G10H 2210/031* (2013.01); *G10H 2210/056* (2013.01); *G10H 2220/005* (2013.01); *G10H 2220/011* (2013.01); *G10H 2240/081* (2013.01);

(Continued)

(58) Field of Classification Search
None
See application file for complete search history.

(56) References Cited

U.S. PATENT DOCUMENTS

| | | | |
|---|---|---|---|
| 7,022,905 B1 ‡ | 4/2006 | Hinman | G10H 1/0041 84/609 |
| 7,031,980 B2 ‡ | 4/2006 | Logan | G11B 27/105 |

(Continued)

OTHER PUBLICATIONS

Dawen Liang et al. "Music Genre Classification with the Million Song Dataset 15-826 Final Report." Carnegie Mellon University (Dec. 2011) http://www.ee.columbia.edu/~dliang/files/FINAL.pdf.‡

(Continued)

*Primary Examiner* — Richard Z Zhu

(74) *Attorney, Agent, or Firm* — Merchant & Gould P.C.

(57) ABSTRACT

A lyrics analyzer generates tags and explicitness indicators for a set of tracks. These tags may indicate the genre, mood, occasion, or other features of each track. The lyrics analyzer does so by generating an n-dimensional vector relating to a set of topics extracted from the lyrics and then using those vectors to train a classifier to determine whether each tag applies to each track. The lyrics analyzer may also generate playlists for a user based on a single seed song by comparing the lyrics vector or the lyrics and acoustics vectors of the seed song to other songs to select songs that closely match the seed song. Such a playlist generator may also take into account the tags generated for each track.

36 Claims, 8 Drawing Sheets

Related U.S. Application Data

(60) Provisional application No. 62/552,882, filed on Aug. 31, 2017.

(51) Int. Cl.

| | | |
|---|---|---|
| *G06N 20/20* | (2019.01) | |
| *G06F 40/30* | (2020.01) | |
| *G06F 40/242* | (2020.01) | |
| *G06F 40/279* | (2020.01) | |
| *G06N 20/00* | (2019.01) | |
| *G06F 16/683* | (2019.01) | |
| *G06F 16/68* | (2019.01) | |
| *G06F 17/18* | (2006.01) | |
| *G06N 5/00* | (2023.01) | |

(52) U.S. Cl.
CPC . *G10H 2240/085* (2013.01); *G10H 2240/141* (2013.01)

(56) References Cited

U.S. PATENT DOCUMENTS

| | | | | |
|---|---|---|---|---|
| 8,473,981 B1* | 6/2013 | Gargi | G06V 20/70 | 725/40 |
| 8,583,674 B2* | 11/2013 | Zheleva | G06F 16/437 | 705/26.7 |
| 8,856,051 B1* | 10/2014 | Song | G06N 20/00 | 706/12 |
| 9,110,955 B1‡ | 8/2015 | Bernhardsson | G06F 16/24578 | |
| 9,361,377 B1 | 6/2016 | Azari | | |
| 9,589,237 B1* | 3/2017 | Qamar | G06N 3/08 | |
| 9,767,416 B2* | 9/2017 | Tristan | G06F 16/355 | |
| 9,767,827 B2‡ | 9/2017 | Paquier | G10L 25/48 | |
| 9,990,413 B2* | 6/2018 | Jung | G06F 16/639 | |
| 10,068,573 B1‡ | 9/2018 | Aykac | G06F 3/167 | |
| 10,262,239 B2‡ | 4/2019 | Polak | G06K 9/4604 | |
| 10,382,373 B1‡ | 8/2019 | Yang | G06N 20/00 | |
| 10,423,250 B2‡ | 9/2019 | Beaumier | G06F 3/165 | |
| 10,510,328 B2‡ | 12/2019 | Nazer | G06N 20/20 | |
| 10,770,044 B2 | 9/2020 | Nazer | | |
| 10,957,290 B2 | 2/2021 | Nazer | | |
| 11,086,936 B2 | 8/2021 | Lamere | | |
| 2006/0206478 A1* | 9/2006 | Glaser | G06F 16/60 | 707/999.005 |
| 2007/0220552 A1 | 9/2007 | Juster | | |
| 2008/0147215 A1‡ | 6/2008 | Kim | G06F 16/635 | 700/94 |
| 2008/0189330 A1‡ | 8/2008 | Hoos | G06F 16/68 | |
| 2009/0106370 A1‡ | 4/2009 | Dreyfus | H04L 51/00 | 709/20 |
| 2009/0306797 A1‡ | 12/2009 | Cox | G06F 16/683 | 700/94 |
| 2010/0057536 A1* | 3/2010 | Stefik | G06Q 30/0277 | 705/26.1 |
| 2011/0060738 A1‡ | 3/2011 | Gates | G06F 16/68 | 707/73 |
| 2011/0030211 A1‡ | 12/2011 | Chidlovskii | G06N 20/00 | 706/12 |
| 2011/0302111 A1 | 12/2011 | Chidlovskii | | |
| 2012/0089621 A1‡ | 4/2012 | Liu | G06F 16/335 | 707/74 |
| 2012/0123978 A1* | 5/2012 | Toderice | G06N 20/00 | 706/12 |
| 2012/0203783 A1‡ | 8/2012 | Dreyfus | H04L 51/00 | 707/74 |
| 2013/0089304 A1‡ | 4/2013 | Jiang | H04N 21/2743 | 386/28 |
| 2014/0074861 A1* | 3/2014 | Bieschke | H04N 21/44224 | 707/748 |
| 2014/0180762 A1‡ | 6/2014 | Gilbert | G06Q 30/02 | 705/7 |
| 2014/0214848 A1* | 7/2014 | Devkar | G06F 16/285 | 707/740 |
| 2015/0310352 A1‡ | 10/2015 | Kyaw | G06N 5/022 | 706/12 |
| 2017/0091322 A1‡ | 3/2017 | Agrawal | G06F 16/3346 | |
| 2017/0140261 A1‡ | 5/2017 | Qamar | G06F 16/245 | |
| 2017/0372221 A1‡ | 12/2017 | Krishnamurthy | G06N 7/005 | |
| 2018/0068231 A1‡ | 3/2018 | Sharma | G06F 16/35 | |
| 2018/0239822 A1* | 8/2018 | Reshef | G06F 40/284 | |
| 2018/0285461 A1‡ | 10/2018 | Smith | G06F 16/954 | |
| 2018/0357548 A1‡ | 12/2018 | Nichols | G06N 5/04 | |
| 2019/0340245 A1‡ | 11/2019 | Zhu | G06F 40/295 | |

OTHER PUBLICATIONS

Khailian. "Modulo?" https://github.com/Khailian/Modulo7 (Unknown Publication Date).‡

Ruth Dhanaraj et al. "Automatic Prediction of Hit Songs." Int. Conf. on Music Info. Retrieval. (Sep. 2005) http://www.hpl.hp.com/techreports/2005/HPL-2005-149.pdf.‡

Arunav Sanyal "Modulo7: A Full Stack Music Information Retrieval and Structured Querying Engine." Thesis submitted to The John Hopkins University, (Dec. 2016). https://jscholarship.library.jhu.edu/bitstream/handle/1774.2/40683/SANYAL-THESIS-2016.pdf?sequence=1&isAUowed=y.‡

Dhanaraj, Ruth, et al. "Automatic Prediction of Hit Songs." Int. Conf. on Music Info. Retrieval. (Sep. 2005) http://www.hpl.hp.com/techreports/2005/HPL-2005-149.pdf, 9 pages.

Khailian, "Modulo7", https://github.com/Khailian/Modulo7 (Unknown Publication Date), 2 pages.

Liang, Dawen, et al. "Music Genre Classification with the Million Song Dataset 15-826 Final Report." Carnegie Mellon University (Dec. 2011) http://www.ee.columbia.edu/.about.dliang/files/FINAL.pdf, 31 pages.

Sanyal, Arunav, "Modulo7: A Full Stack Music Information Retrieval and Structured Querying Engine", Thesis submitted to The John Hopkins University, (Dec. 2016). https://jscholarship.library.jhu.edu/bitstream/handle/1774.2/40683/SANYAL—THESIS-2016.pdf?sequence=1&isAllowed=y, 112 pages.

\* cited by examiner
‡ imported from a related application

400

```
1. Tonight Stop Dance Hand Shake Alright Fly Show Drop Make
2. Bit Doo York Rhyme Mighty West Lyric America East Funk
3. Yeah Baby Girl Hey Ooh Gotta Good Make Back Move
4. Nigga Fuck Shit Bitch Money Make Back Hit Man Yall
5. Life Live Back Heart Feel Time Break Lose Fall Find
6. Day Night Light Dream Eye Sun Time Sky World Rain
7. Love Make Time Feel Give Thing Heart Find Life Wait
8. Run Rock Beat Roll Follow High Music River Low Wild
9. Home Back Boy Drink Man Town Friend Call Work Ride
10. God Man People Black Kill Lord Blood World Dead War
```

| (Genre) | (Time/Occasion) | Disney | (Mood) |
|---|---|---|---|
| Rap | Birthday | Children | Happy |
| Country | Christmas | Explicit | Sad/Cry/Depression |
| House | Halloween | Romance/Love/Sex | |
| Rock | Wedding | Travel/Car/Road/Fly | |
| Pop | | | |

FIG. 5

SPOKEN WORDS ANALYZER

CROSS-REFERENCE TO RELATED APPLICATION

This application is a continuation of U.S. patent application Ser. No. 16/111,614, filed Aug. 24, 2018, which claims priority under 35 U.S.C. 119(e) to U.S. Provisional Application No. 62/552,882, filed Aug. 31, 2017, the contents of both of which are incorporated herein by reference, as if set forth fully herein.

BACKGROUND

Musical tracks (or songs) are typically labelled by listeners in a variety of ways, including genre (pop, rock, rap, country, heavy metal, hip-hop, grunge, etc.) occasion (Christmas, Halloween, wedding, driving, etc.) mood (romantic, depressed, etc.) and others. Tracks stored in computerized play systems are frequently stored with one or more such labels or tags associated with them. Each track may have numerous tags associated with it. For example, a single song may be tagged as "pop," "Christmas," and "romantic." Such tags, however, are generally added manually and are frequently inconsistent between songs, as tags may rely on the music producers to supply tags. Each producer may have inconsistent views on what constitutes a given tag or even over-tag songs in an effort to encourage more play.

A variety of methods have been used to systematically tag tracks in a consistent way. While advancements have been made in such automated tagging, technical challenges still remain. Previous efforts have required significant human intervention and tuning to, for example, label a set of tracks with a single genre, each.

Listeners also frequently seek to create playlists of music with similar songs. Typical methods for playlist creation frequently relate to using pre-generated song tags to choose songs with similar sets of tags. One technical problem with creating playlists of music with similar songs involves generating playlists based on a seed song where the members of the playlist are lyrically similar or a combination of acoustically and lyrically similar to the seed song.

A common problem for music is to determine whether a song should be considered explicit or not. Some parents may not wish younger listeners to hear music with certain words or ideas contained within. One challenge for determining whether a given song is explicit is that some may consider a song explicit even if no individual word would be considered explicit. For example, concepts or sex or violence may be expressed more clearly than some parents wish without any individually objectionable words. Currently, music providers rely on the determination of the music producers to label certain tracks as explicit. There exists a need for a flexible, automatic method for training a system to classify music as explicit or not, based on a sample set.

US 2008/0147215 describes generating music recommendations based on input of theme, mood, and selected features. The input is compared to a library of pre-tagged and processed musical tracks to determine similar songs for recommendation.

US 2014/0214848 describes a system for generating a playlist based upon the mood of the user. The system determines the mood of the user and searches a library of music for comparable tracks by comparing the mood to pre-generated emotion tags associated with the music.

Dawen Liang, Haijie Gu, and Brendan O'Connor, *Music Classification with the Million Song Dataset* 15-826 *Final Report*, Carnegie Mellon University (Dec. 3, 2011) describes a method for predicting a single genre for a set of songs by training a classifier with acoustical and lyrical information based, in part, on human-constructed emotional valence features for lyrics. The system compared the acoustics and lyrics of songs to determine to which genre a given song most closely matched.

Ruth Dhanaraj and Beth Logan, *Automatic Prediction of Hit Songs*, HP Laboratories Cambridge (Aug. 17, 2005) describes generating classifiers using lyrics and acoustic-based vectors to determine which songs were more likely to become hits.

SUMMARY

The foregoing and other limitations are overcome by a system, method, and non-transitory computer medium storing instructions for generating a playlist, for predicting tags, or for predicting whether a song contains explicit lyrics.

In an example, the method for generating a playlist includes receiving a plurality of tracks at an information storage and retrieval platform via an electronic communication from a datastore of tracks, where a plurality of those tracks have lyrics. Extracting n topics summarizing the plurality of lyrics, each topic consisting of m words, where m and n are both integers. Generating for each of the plurality of tracks, an n-dimensional vector using a generative statistical model based on the association of the lyrics of the track with the n topics, thereby generating a plurality of n-dimensional lyrics vectors. Receiving a seed track from among the plurality of tracks. Calculating a similarity score for each of the plurality of tracks to the seed track, based on their respective n-dimensional lyrics vectors, thereby generating a plurality of similarity scores. Then generating a playlist of tracks based on the plurality of similarity scores.

In another example, the system for generating a playlist includes a computer-readable memory storing executable instructions and one or more processors in communication with the computer-readable memory, wherein the one or more processors are programmed by the executable instructions to at least perform the steps of receiving a plurality of tracks at an information storage and retrieval platform via an electronic communication from a datastore of tracks, a plurality of the tracks comprising lyrics extracting n topics summarizing the plurality of lyrics, each topic consisting of m words, where m and n are integers generating, for each of the plurality of tracks, an n-dimensional vector using a generative statistical model based on the association of the lyrics of the track with the n topics, thereby generating a plurality of n-dimensional lyrics vectors receiving a seed track from among the plurality of tracks calculating a similarity score for each of the plurality of tracks to the seed track, based on their respective n-dimensional lyrics vectors, thereby generating a plurality of similarity scores, and generating a playlist of tracks based on the plurality of similarity scores.

In another example, the instructions for generating a playlist comprise the steps of receiving a plurality of tracks at an information storage and retrieval platform via an electronic communication from a datastore of tracks, where a plurality of those tracks have lyrics. Extracting n topics summarizing the plurality of lyrics, each topic consisting of m words, where m and n are both integers. Generating for each of the plurality of tracks, an n-dimensional vector using a generative statistical model based on the association of the lyrics of the track with the n topics, thereby generating a plurality of n-dimensional lyrics vectors. Receiving a seed track from among the plurality of tracks. Calculating a similarity score for each of the plurality of tracks to the seed track, based on their respective n-dimensional lyrics vectors, thereby generating a plurality of similarity scores. Then generating a playlist of tracks based on the plurality of similarity scores.

In another example, the method for predicting tags for songs includes receiving a plurality of tracks at an information storage and retrieval platform via an electronic communication from a datastore of tracks, a plurality of the tracks comprising lyrics. Extracting n topics summarizing the plurality of lyrics, each topic consisting of m words, where m and n are integers. Generating, for each of the plurality of tracks, an n-dimensional vector using a generative statistical model based on the association of the lyrics of the track with the n topics, thereby generating a plurality of n-dimensional lyrics vectors. Receiving a set of one or more tags. Receiving a set of training tracks from among the plurality of tracks associated with each of the tags. Training a tag classifier for each of the set of tags based on the lyrics vectors of each of the training tracks for each tag. Then, predicting a set of tags for each of the plurality of tracks by applying each tag classifier to the lyrics vectors of each of the plurality of tracks.

In another example, the system for predicting tags includes a computer-readable memory storing executable instructions and one or more processors in communication with the computer-readable memory, wherein the one or more processors are programmed by the executable instructions to at least perform the steps of receiving a plurality of tracks at an information storage and retrieval platform via an electronic communication from a datastore of tracks, a plurality of the tracks comprising lyrics, extracting n topics summarizing the plurality of lyrics, each topic consisting of m words, where m and n are integers, generating, for each of the plurality of tracks, an n-dimensional vector using a generative statistical model based on the association of the lyrics of the track with the n topics, thereby generating a plurality of n-dimensional lyrics vectors, receiving a set of one or more tags, receiving a set of training tracks from among the plurality of tracks associated with each of the tags, training a tag classifier for each of the set of tags based on the lyrics vectors of each of the training tracks for each tag, and predicting a set of tags for each of the plurality of tracks by applying each tag classifier to the lyrics vectors of each of the plurality of tracks.

In another example, the instructions for predicting tags includes receiving a plurality of tracks at an information storage and retrieval platform via an electronic communication from a datastore of tracks, a plurality of the tracks comprising lyrics, extracting n topics summarizing the plurality of lyrics, each topic consisting of m words, where m and n are integers, generating, for each of the plurality of tracks, an n-dimensional vector using a generative statistical model based on the association of the lyrics of the track with the n topics, thereby generating a plurality of n-dimensional lyrics vectors, receiving a set of one or more tags, receiving a set of training tracks from among the plurality of tracks associated with each of the tags, training a tag classifier for each of the set of tags based on the lyrics vectors of each of the training tracks for each tag, and predicting a set of tags for each of the plurality of tracks by applying each tag classifier to the lyrics vectors of each of the plurality of tracks.

In another example, the method for predicting whether a song is explicit includes receiving a plurality of tracks at an information storage and retrieval platform via an electronic communication from a datastore of tracks, a plurality of the tracks comprising lyrics. Extracting n topics summarizing the plurality of lyrics, each topic consisting of m words, where m and n are integers. Generating, for each of the plurality of tracks, an n-dimensional vector using a generative statistical model based on the association of the lyrics of the track with the n topics, thereby generating a plurality of n-dimensional lyrics vectors. Receiving a set of training tracks from among the plurality of tracks, each training track having an indicator of explicitness. Training a classifier for determining whether a track is explicit, based on the lyrics vectors of each of the training tracks. Then generating an indicator of explicitness for each of the plurality of tracks by applying the classifier to the lyrics vectors of each of the plurality of tracks.

In another example, the system for generating an indicator of explicitness includes a computer-readable memory storing executable instructions and one or more processors in communication with the computer-readable memory, wherein the one or more processors are programmed by the executable instructions to at least perform the steps of receiving a plurality of tracks at an information storage and retrieval platform via an electronic communication from a datastore of tracks, a plurality of the tracks comprising lyrics, extracting n topics summarizing the plurality of lyrics, each topic consisting of m words, where m and n are integers, generating, for each of the plurality of tracks, an n-dimensional vector using a generative statistical model based on the association of the lyrics of the track with the n topics, thereby generating a plurality of n-dimensional lyrics vectors, receiving a set of training tracks from among the plurality of tracks, each training track having an indicator of explicitness, training a classifier for determining whether a track is explicit, based on the lyrics vectors of each of the training tracks, and generating an indicator of explicitness for each of the plurality of tracks by applying the classifier to the lyrics vectors of each of the plurality of tracks.

In another example, the instructions for generating an indicator of explicitness includes receiving a plurality of tracks at an information storage and retrieval platform via an electronic communication from a datastore of tracks, a plurality of the tracks comprising lyrics, extracting n topics summarizing the plurality of lyrics, each topic consisting of m words, where m and n are integers, generating, for each of the plurality of tracks, an n-dimensional vector using a generative statistical model based on the association of the lyrics of the track with the n topics, thereby generating a plurality of n-dimensional lyrics vectors, receiving a set of training tracks from among the plurality of tracks, each training track having an indicator of explicitness, training a classifier for determining whether a track is explicit, based on the lyrics vectors of each of the training tracks, and generating an indicator of explicitness each of the plurality of tracks by applying the classifier to the lyrics vectors of each of the plurality of tracks.

BRIEF DESCRIPTION OF THE DRAWINGS

The features and advantages of the example embodiments of the invention presented herein will become more apparent from the detailed description set forth below when taken in conjunction with the following drawings.

FIG. 4 shows an example set of topics and words extracted from a large set of musical tracks according to an embodiment of the present invention.

FIG. 5 shows an example set of tags that may be applied to tracks, according to an embodiment of the present invention.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

The present technology gains substantial efficiency over previous methods by more thoroughly exploiting the lyrics from a relatively large number of musical tracks to better categorize such tracks by tags recognizable to a user, indicate which tracks are explicit, and to build better, more coherent playlists for users based on a single "seed" track. Each embodiment uses methods that better scale with the rise in computing power to recognize similarities between tracks.

System for Receiving and Responding to Musical Queries and Requests

Figure 1:
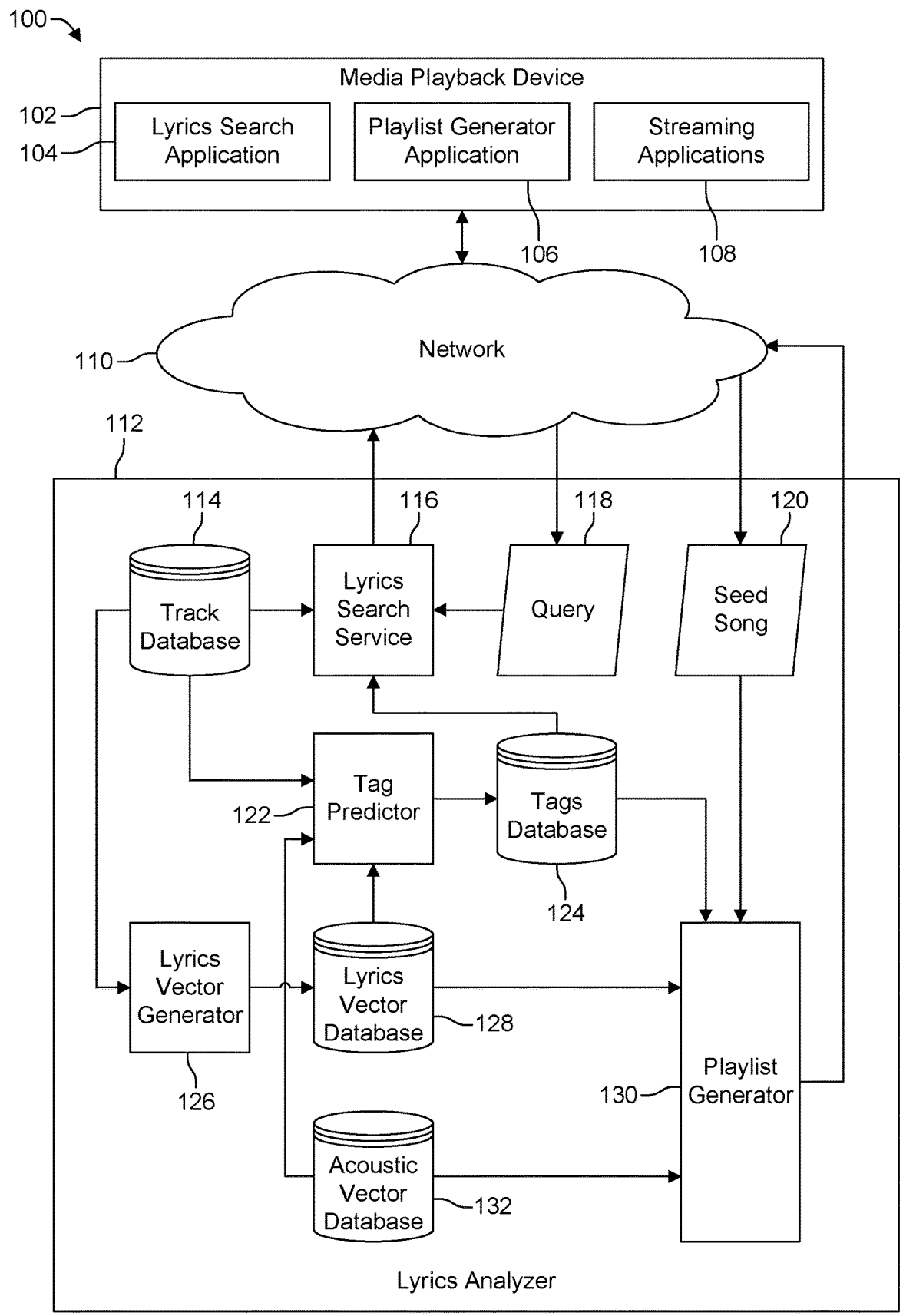
FIG. 1 shows an example system in which embodiments of the present invention may be employed.

FIG. 1 illustrates an example of a media content provision system 100 for receiving and responding to queries and requests from a media playback device 102 via a network 110 in accordance with an example embodiment. The system includes a media playback device 102, a lyrics analyzer 112, and a network 110 for conveying communications between them. The media playback device 102 and lyrics analyzer 112 include various components usable to perform one or more of the operations described herein.

The media playback device 102 is a computing device. The media playback device 102 runs an operating system capable of operating one or more application programs that perform various functions such as, for example, a lyrics search application 104, a playlist generator application 106, and streaming applications 108. The media playback device 102 is in communication with a network 110.

The lyrics analyzer 112 is operated on a computing device remote from the media playback device 102. The lyrics analyzer 112 is connected to the media playback device 102 via a network 110. The lyrics analyzer 112 contains or is in communication with various databases, including a track database 114, tags database 124, lyrics vector database 128, and acoustic vector database 132. The lyrics analyzer 112 may receive a query 118 from the media playback device 102 via the network 110 in a lyrics search service 116. The lyrics search service 116 responds to the query 118 by comparing the query request to lyrics contained within the track database 114 and to tags contained within the tags database 124.

The tags database 124 is populated by a tag predictor 122 within the lyrics analyzer 112. The tag predictor 122 may receive lyrics vectors from the lyrics vector database 128, acoustic vectors from the acoustic vector database 132, and track information from the track database 114. The tag predictor 122 generates tags based on the information it receives and stores those tags within the tags database 124.

The lyrics vector database 128 is populated from the lyrics vector generator 126. The lyrics vector generator 126 receives tracks from the track database 114, processes the lyrics by, for example, extracting topics from the lyrics of the received tracks and generating multi-dimensional vectors from those tracks and based on the topics. The lyrics vector generator 126 then stores those vectors in the lyrics vector database 128.

The acoustic vector database 132 is populated with acoustic vectors representing multi-dimensional vectors based on the non-lyrics audio features within the tracks. For example, a 7-dimensional acoustic vector may be calculated based on the following seven acoustic attributes: Danceability, Energy, Speechiness, Liveness, Acousticness, Valence, and Instrumentalness, where each attribute represents a floating point number between 0.0 and 1.0. Such acoustic vectors may be generated in a variety of ways now known or future developed and the details are not provided herein. The above acoustic attributes may be defined as follows:

Danceability: describes how suitable a track is for dancing using a number of musical elements (the more suitable for dancing, the closer to 1.0 the value). The combination of musical elements that best characterize danceability include tempo, rhythm stability, beat strength, and overall regularity.

Energy: represents a perceptual measure of intensity and powerful activity released throughout the track. Typical energetic tracks feel fast, loud, and noisy. For example, death metal has high energy, while a Bach prelude scores low on the scale. Perceptual features contributing to this attribute include dynamic range, perceived loudness, timbre, onset rate, and general entropy.

Speechiness: detects the presence of spoken words in a track. The more exclusively speech-like the recording (e.g. talk show, audio book, poetry), the closer to 1.0 the attribute value. Values above 0.66 describe tracks that are probably made entirely of spoken words. Values between 0.33 and 0.66 describe tracks that may contain both music and speech, either in sections or layered, including such cases as rap music. Values below 0.33 most likely represent music and other nonspeech-like tracks.

Liveness: detects the presence of an audience in the recording. The more confident that the track is live, the closer to 1.0 the attribute value. In an example embodiment, the threshold for detecting liveness is higher than for speechiness. A value above 0.8 provides strong likelihood that the track is live. Values between 0.6 and 0.8 describe tracks that may or may not be live or contain simulated audience sounds at the beginning or end. In an example embodiment, values below 0.6 represent studio recordings.

Acousticness: represents the likelihood a recording was created by solely acoustic means such as voice and acoustic instruments as opposed to electronically such as with synthesized, amplified, or effected instruments. Tracks with low acousticness include electric guitars, distortion, synthesizers, auto-tuned vocals, and drum machines, whereas songs with orchestral instruments, acoustic guitars, unaltered voice, and natural drum kits will have acousticness values closer to 1.0.

Valence: describes the musical positiveness conveyed by a track. Tracks with high valence sound more positive (e.g., happy, cheerful, euphoric), while tracks with low valence sound more negative (e.g. sad, depressed, angry). This attribute in combination with energy is a strong indicator of acoustic mood, the general emotional qualities that may characterize the acoustics of the track. Note that in the case of vocal music, lyrics may differ semantically from the perceived acoustic mood.

Instrumentalness: represents the likelihood a recording contains only instruments and absolutely no vocal track. Songs featuring the human voice, more particularly lyrics, even with instruments, will score low on the attribute scale. Songs with only instruments will score high on the scale.

The lyrics analyzer 112 may also receive from the playlist generator application 106 on the media playback device 102, a request for a playlist, including a seed song 120. The seed song 120 may be a track contained within the track database 114 and, thus, its lyrics vector and acoustic vector are known to the lyrics analyzer 112. The playlist generator 130 may create a playlist by comparing the lyrics vector and acoustic vector of the seed song 120 to vectors contained within the lyrics vector database 128 and acoustic vector database 132 and choosing other tracks that are similar to the seed song 120. Once a number of sufficiently similar songs have been determined to fill the playlist request, the playlist generator 130 may send the generated playlist back to the media playback device 102 via the network 110.

Figure 2:
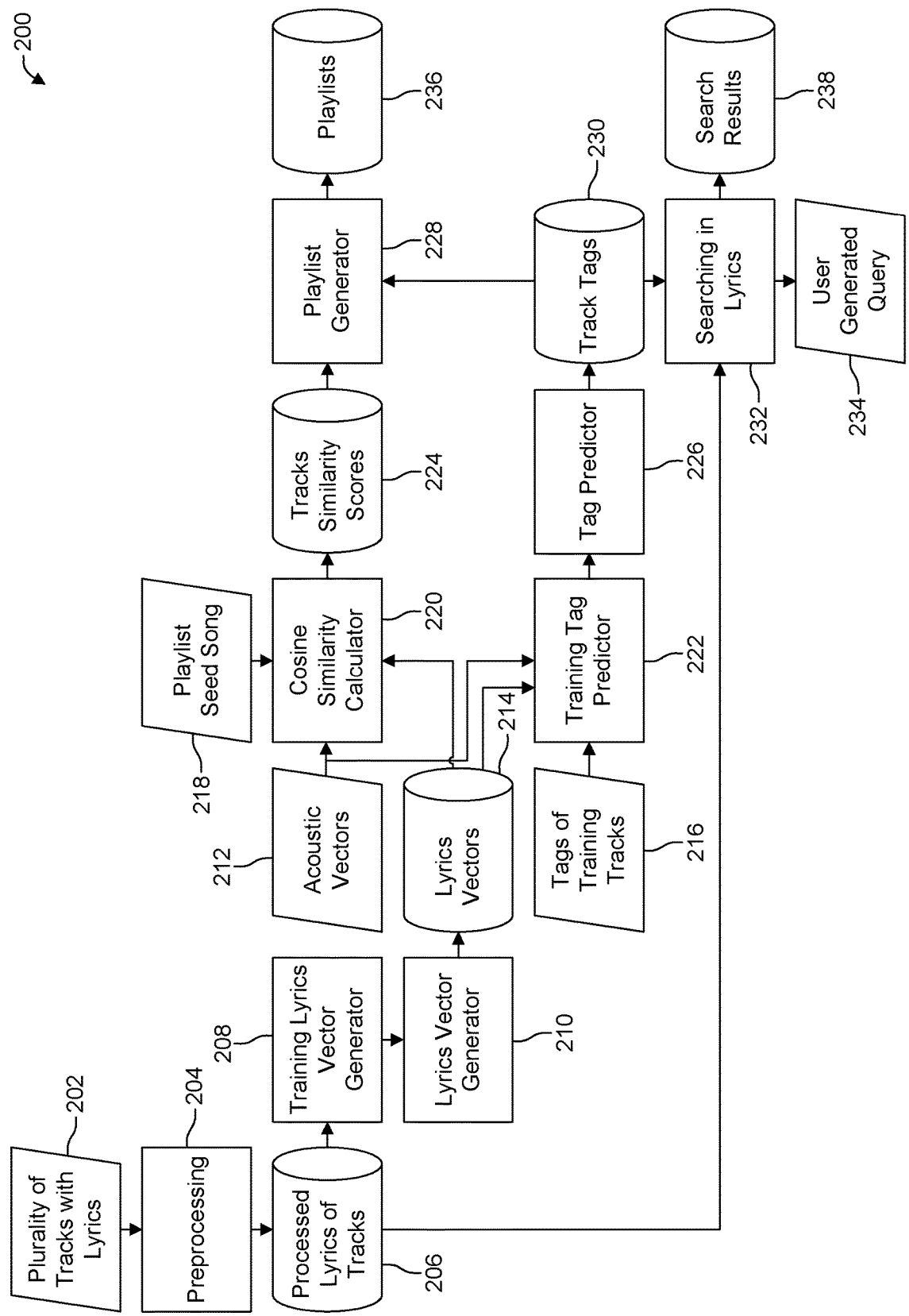
FIG. 2 shows a flow diagram for generating tags and/or creating playlists in accordance with an example embodiment of the present invention.

Process Flow for Generating Tags and Playlists Based on Lyrics and Acoustic Vectors FIG. 2 illustrates a process flow 200 for generating tags and playlists by generating and using lyrics vectors in accordance with an example embodiment. The process is performed by various components, such as the components described above in connection with the lyrics analyzer 112. The process begins by receiving a plurality of tracks 202 having lyrics. Lyrics may be audio-to-text transcribed, may come, separately, in another file, or may be supplied in some other way. This plurality of tracks 202 with any accompanying lyrics may be stored in a track database 114.

The lyrics analyzer 112 may then preprocess the lyrics by a variety of means now known or future developed. For example, preprocessing 204 may include white-space standardizing the lyrics, which may include converting some or all whitespace characters to a standard character for more consistent comparison of lyrics, removing excess whitespace characters, splitting certain compound words by inserting whitespace, or other forms of standardization. Preprocessing 204 may also include lowercasing all letters in lyrics to more efficiently compare words. Preprocessing 204 may also include removing stopwords. Removing stopwords may include removing very common words with no comparison value, such as "the" or "and" or "is," that do not aid in determining the content of lyrics. Preprocessing 204 may also include removing punctuation, such as commas, semicolons, dashes, periods, or other such marks. Preprocessing 204 may also include lemmatizing the words of the lyrics. Lemmatization may include converting all inflections of a word to the base form of the word. For example, the words "walked," "walks," and "walking," are all inflections of the word "walk," and through lemmatization, the system may convert all such forms to the base form for more uniform comparison of lyrics. Preprocessing 204 may also include removing character repetition based on a dictionary. Finally, preprocessing 204 may include any combination of the above-mentioned forms of preprocessing. Preprocessing 204 may be optional.

The processed lyrics of tracks 206 may then be used directly to search in lyrics 232 to fulfill user generated queries 234. Such a user generated query 234 may be similarly preprocessed, as above, within the search process and compared to the processed lyrics to find matches. The system would then return appropriate search results 238.

The processed lyrics of the tracks 206 may also be passed into a training lyrics vector generator 208. The training lyrics vector generator 208 may extract a set of topics for use in generating lyrics vectors 214. Extracting topics may be done using the Latent Dirichlet Allocation (LDA) model. Using LDA or another generative statistical model, the system analyzes the processed lyrics of the tracks 206 and extracts a set of topics, each topic containing a number of words. The words in a topic are those frequently found together within the set of lyrics.

The number of topics and the number of words for each topic may be set arbitrarily. The computational intensiveness of the extraction process may be adjusted based on the number of topics selected. Also, the number of topics dictates the number of dimensions in the later-generated lyrics vectors 214. Greater dimensionality in vectors also increases the complexity in comparing such vectors, so greater numbers of topics also increases the computational complexity (and thus time) in comparing lyrics vectors, later. The advantage to a greater number of topics, however, is that the later-generated vectors will have more dimensions of differentiation and generally, up to a certain point, lead to a lower level of perplexity. Perplexity, here, means the measure of how well the model predicts a topic for a given track. Lower levels of perplexity generally indicate a more efficient labeling process, but at the cost of higher computational intensity. The example embodiments described herein thus provide the ability to scale the comparison process to increasing computational capacity via modifying the number of topics and having the topics, themselves, generated based on the lyrics. The number of words in each topic may be determined in a variety of ways now known or future developed. For example, the number of words per topic may be determined based on the total vocabulary of all analyzed lyrics. In an alternative example, the number of words per topic may be arbitrarily set.

An example of 10 topics, each displaying the 10 most frequently found words, generated from a corpus of approximately 613,000 songs using LDA, may be seen in FIG. 4. As may be appreciated, the words in each topic may overlap. For example, topics 3, 4, and 5 in FIG. 4 each contain the word "back," but those topics do not appear to be overall similar. As noted above, the words of a topic are those most likely to be found together and, when found together, indicate a track's association with that topic.

The generated topics are then used by the lyrics vector generator 210 to generate an n-dimensional vector for each set of processed lyrics of tracks 206, describing that track's association with each of the topics. The number of dimensions (n) is equal to the number of topics. In the example set of topics found in FIG. 4, the lyrics vector generator 210 would generate a 10-dimensional vector for each track, showing the relationship between the processed lyrics of tracks 206 and each of the topics. These lyrics vectors 214 may be stored in a lyrics vector database 128 for later use.

To generate a playlist, the system may receive a playlist seed song 218. The playlist seed song 218 represents what song the other songs in the playlist should be similar to. The system calculates the similarity between the lyrics vector 214 of each of the tracks in the plurality of tracks 202 and the lyrics vector 214 of the playlist seed song 218. This may be done in a cosine similarity calculator 220, using a cosine distance comparison between the lyrics vector of the playlist seed song 218 and the lyrics vector of each track in the plurality of tracks 202. Other methods for calculating the similarity measure between vectors will be known to those of skill in the art, and may be similarly applicable. The cosine similarity calculator 220 may generate a set of track similarity scores 224 and store those scores for later playlist generation.

The playlist generator 228 may use the tracks' similarity scores to determine which tracks best suit a playlist for a given playlist seed song 218. The method for determining track suitability may include choosing the most similar tracks or other methods of choosing, such as looking for similar track tags 230. The playlist generator 228 then creates one or more playlists 236 which may be conveyed to the media playback device 102 through the network 110, as shown in FIG. 1.

In an alternative embodiment, the system may also receive an acoustic vector 212 for each of the plurality of tracks. Such acoustic vectors may be stored in an acoustic vector database 132. An acoustic vector 212 is another multi-dimensional vector representing the association between the track and a set of acoustic features, based on the non-lyrical audio features of the track. For example, the acoustic vector 212 may be a seven-dimensional vector. In such an embodiment, the cosine similarity calculator 220 may compare a combination of both the lyrics vector 214 and the acoustic vector 212 for each of the plurality of tracks 202 to a combination of the lyrics vector 214 and the acoustic vector 212 for the playlist seed song 218 to calculate a track similarity score 224. One example of such a combination of lyrics and acoustic vectors may be to concatenate the vectors into a hybrid vector prior to comparison and then generating a set of track similarity scores 224 by calculating the similarity between the hybrid vector of each of the plurality of tracks and the hybrid vector of the playlist seed song 218.

Use of the acoustic vector 212, combined with the lyrics vector 214, offers additional benefits, such as generating playlists 236 with both lyrics and audio similarities between songs. For example, the lyrics for a romantic ballad and a punk remix of that ballad may be identical, but a user seeking a romantic playlist based on the original ballad may not wish to include the punk version. Use of the acoustic vector 212 combined with the lyrics vector 214 may better meet the requester's expectations.

The lyrics vectors 214 generated by the lyrics vector generator 210 may also be used to predict tags for a track, based on a set of desired tags. An example set of potential tags may be seen in FIG. 5. Tags may relate to a wide range of potential associations. For example, tags may include terms related to genre, such as rap, country, rock, pop, etc. As a further example, tags may include terms for time or occasion, such as Christmas, birthday, or wedding. As a yet further example, tags may relate to a mood, such as happiness or sadness. As an additional example, tags may relate to activities, such as travel, dance, running, driving, or studying. Other potential tags may be determined from listener playlist names.

The training tag predictor 222 may receive lyrics vectors 214 generated by the lyrics vector generator 210 with appropriate pre-generated tags 216 for a training set of tracks for a given set of tags. Tags 216 for training data may include other metadata, as well, such as artist, year of publication, length of track, and the like. Using the tags 216, the training tag predictor 222 trains a tag classifier for each of the desired tags. Training a classifier may be done in a variety of ways, including a Random Forest classifier, Naïve Bayes classifier, a Decision Tree classifier, a Stochastic Gradient Descent classifier, a K-Nearest Neighbor classifier, or other classification models now known or future developed. In the present embodiment, the classifier is applied to the lyrics vectors 214 received from the lyrics vector generator 210 for each of the training tracks for which training tags 216 for tracks has been received. Through the process of training the classifier, the classifier learns which topics are more or less associated with a given tag. The resulting tag classifiers generated for each of the desired tags are then used by the tag predictor 226.

The received tags 216 for tracks may come from any of a variety of sources. Training track tags 216 may come from titles of playlists for which users have already created playlists. For example, the training tracks may come from songs commonly associated with playlists containing the words "Christmas," "driving," "dance," "romance," or any other tag of interest. Advantages for using playlist title-generated training tags include the ability to include a large dataset and reflect average users' desired tags without requiring additional effort on the part of administrators of the system. Further advantages include the ability to re-run tag generation to reflect changing musical tastes as user perception of tracks evolves. For example, Taylor Swift's music may have once been perceived as being within the "Country" genre, but user perception may have, over time, come to classify her entire catalogue as "Pop." Using user-generated playlists to generate tags may reflect these types of changes in perception over time. Using tags based on playlists also allows the creation of new tags based on new slang terms as they enter popular use. Tags of training tracks 216 and associated tags may also come from expert analysis of tracks and generation of associated tags. Advantages to using expert-based tags of training tracks include a higher degree of repeatability and consistency between tracks. Using expert-based tags also allows the administrators of the system to more carefully curate tags for which the system will generate tags. This careful curation may save embarrassment or scandal from wildly inappropriate or derogatory tags.

The tag classifier for each desired tag is then used by the tag predictor 226 to predict whether each track of the plurality of tracks 202 should be associated with the given desired tag by comparing the tag classifier to the lyrics vector for each of the plurality of tracks 202. In this way, for each of the plurality of tracks 202, a set of track tags 230 is generated and may be stored in system in, for example, the tags database 124.

In one alternative embodiment, the training tag predictor 222 may train multiple, classifiers using different classifier methods for each desired tag. For example, the training tag predictor 222 may train two classifiers: one, a Random Forest classifier and the second, a Naïve Bayes classifier. The tag predictor 226 may then use the multiple tag classifiers to each predict whether a given tag applies to each of the plurality of tracks 202. The tag predictor 226 may then combine the predicted tags from the multiple tag classifiers to generate a final set of track tags 230 that may be stored in a tags database 124. The predicted tags of each of the multiple classifiers may be combined in a variety of ways now known or future developed. For example, the tag predictor 226 may use the intersection of the predicted tags for each desired tag to generate the final set of track tags 230. In this way, only tags applied by both classifiers would be included in the final set of track tags 230. Alternatively, the tag predictor 226 may use the union of the predicted tags for each desired tag to generate the final set of track tags 230. In this way, all tags predicted by any of the multiple classifiers would be included in the final set of track tags 230. Other methods to combine predicted tags into final tags may also be applied.

In another alternative embodiment, the training tag predictor 222 may, in addition to the lyrics vectors 214, also receive acoustic vectors 212 for each of the plurality of tracks 202. An acoustic vector 212 is another multi-dimensional vector representing the association between the track and a set of acoustic features, based on the non-lyrical audio features of the track. For example, the acoustic vector 212 may be a seven-dimensional vector. The training tag predictor 222 may then use the combination of lyrics vector 214 and acoustic vector 212 for each of the training set of tracks to train a tag classifier for each desired tag. One example of such a combination of lyrics vectors and acoustic vectors may be to concatenate the vectors into a hybrid vector prior to training the tag classifier. The training tag predictor 222 may then use the hybrid classifier to train a tag classifier for each desired tag. The tag predictor 226 may then use the hybrid vector-based tag classifiers to predict whether each track of the plurality of tracks 202 should be associated with the given, desired tag by comparing the classifier to a similar, hybrid vector for each of the plurality of tracks 202. In this way, for each of the plurality of tracks 202, a set of track tags 230 is generated and stored within the system in, for example, the tags database 124.

Use of the acoustic vector 212, combined with the lyrics vector 214, offers additional benefits in predicting tags for tracks. For example, genres of music are frequently strongly associated with sound forms more than with lyrics, such as Samba music or Hip-Hop or Country, each having characteristic sounds. Similarly, certain sounds, such as bells, are common in Christmas music, while certain organ music may be typical of Halloween music. In another example, consistent beats of certain speeds may be indicative of tracks with the "Dance" tag, regardless of lyrics. Use of the acoustic vector 212 combined with the lyrics vector 214 may better determine which tags are appropriate for a given track.

The track tags 230 may also be used directly to search in lyrics 232 to fulfill user generated queries 234. Such a search query, may, for example, search for "Christmas" music or "dance" music or "country" music or any other tag or combination of tags for which track tags 230 have been predicted. The system would then return appropriate search results 238.

Figure 3:
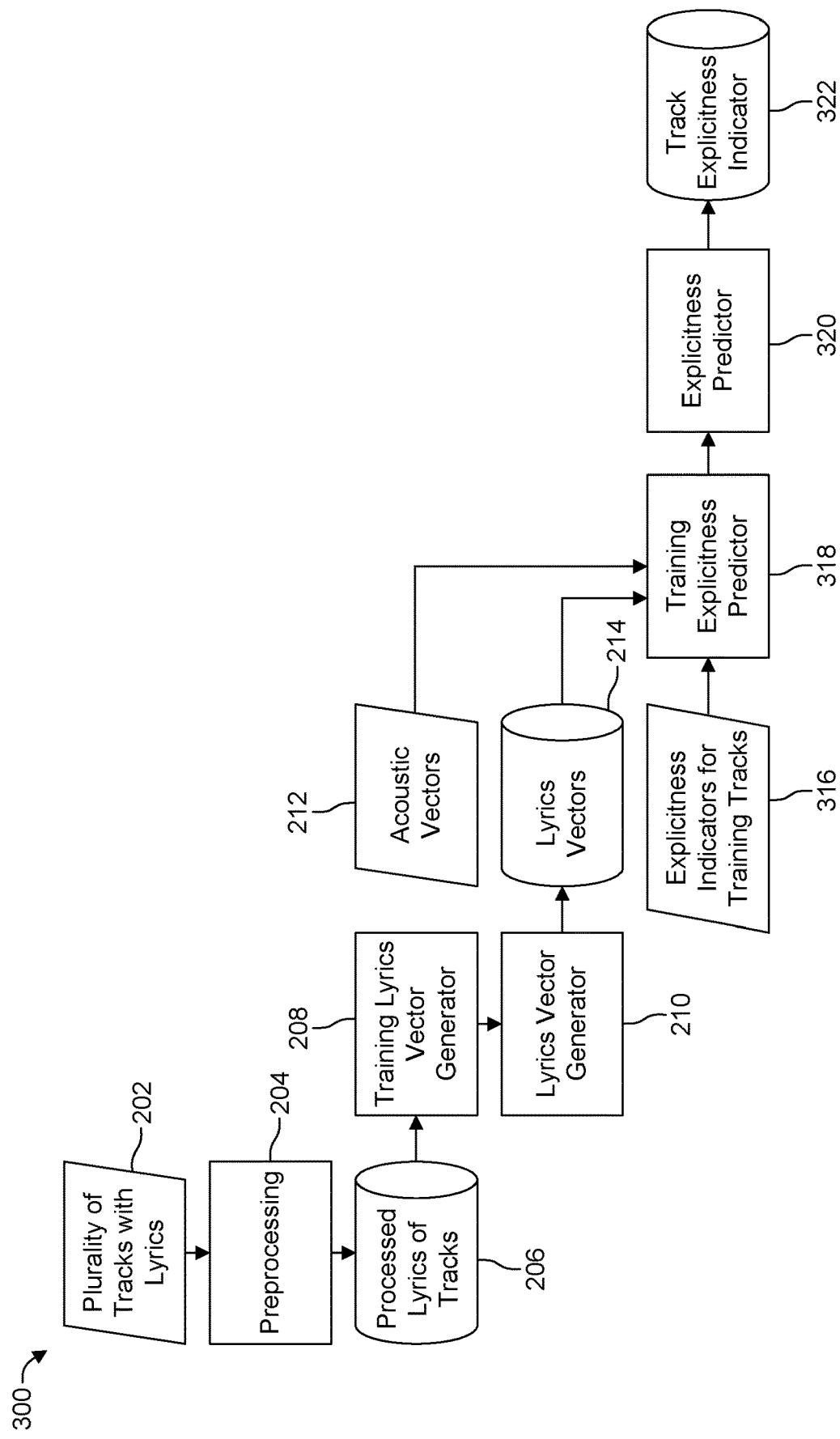
FIG. 3 depicts a flow diagram for generating an indicator of explicitness in accordance with an example embodiment of the present invention.

Process Flow for Generating Indicators of Explicitness Based on Lyrics and Acoustic Vectors FIG. 3 illustrates a process flow 300 for generating explicitness indicators 322 by generating and using lyrics vectors in accordance with an example embodiment. Explicitness may include determining whether tracks contain certain words deemed offensive, but also may seek to determine explicitness based on a wider range of factors. For example, a song may be considered quite sexually explicit without containing any individually offensive word or set of words. Similarly, tracks may contain descriptions of actions or ideas that may be disturbing to some listeners, whether or not those tracks contain specifically offensive words. The described process offers a flexible method for determining explicitness within a plurality of tracks 202. The process is performed by various components, such as the components described above in connection with the lyrics analyzer 112. The process is similar to generating tags, discussed above, and begins by receiving a plurality of tracks 202 having lyrics. Lyrics may be audio-to-text transcribed, may come, separately, in another file, or may be supplied in some other way. This plurality of tracks 202 with any accompanying lyrics may be stored in a track database 114.

The lyrics analyzer 112 may then preprocess the lyrics by a variety of means now known or future developed. For example, preprocessing 204 may include white-space standardizing the lyrics, which may include converting some or all whitespace characters to a standard character for more consistent comparison of lyrics, removing excess whitespace characters, splitting certain compound words by inserting whitespace, or other forms of standardization. Preprocessing 204 may also include lowercasing all letters in lyrics to more efficiently compare words. Preprocessing 204 may also include removing stopwords. Removing stopwords may include removing very common words with no comparison value, such as "the" or "and" or "is," that do not aid in determining the content of lyrics. Preprocessing 204 may also include removing punctuation, such as commas, semicolons, dashes, periods, or other such marks. Preprocessing 204 may also include lemmatizing the words of the lyrics. Lemmatization may include converting all inflections of a word to the base form of the word. For example, the words "walked," "walks," and "walking," are all inflections of the word "walk," and through lemmatization, the system may convert all such forms to the base form for more uniform comparison of lyrics. Preprocessing 204 may also include removing character repetition based on a dictionary. Finally, preprocessing 204 may include any combination of the above-mentioned forms of preprocessing. Preprocessing 204 is optional.

The processed lyrics of the tracks 206 may be passed into a training lyrics vector generator 208. The training lyrics vector generator 208 may extract a set of topics for use in generating lyrics vectors 214. Extracting topics may be done using the Latent Dirichlet Allocation (LDA) model. Using LDA or another generative statistical model, the system analyzes the processed lyrics of tracks 206 and extracts a set of topics, each topic containing a number of words. The words in a topic are those frequently found together within the set of lyrics.

The number of topics and the number of words for each topic may be set arbitrarily. The computational intensiveness of the extraction process can be adjusted based on the number of topics selected. Also, the number of topics dictates the number of dimensions in the later-generated lyrics vectors 214. Greater dimensionality in vectors also increases the complexity in comparing such vectors, so greater numbers of topics also increases the computational complexity (and thus time) in comparing lyrics vectors, later. The advantage to a greater number of topics, however, is that the later-generated vectors will have more dimensions of differentiation and generally, up to a certain point, lead to a lower level of perplexity. Perplexity, here, means the measure of how well the model predicts a topic for a given track. Lower levels of perplexity generally indicate a more efficient labeling process, but at the cost of higher computational intensity. The example embodiments described herein thus provide the ability to scale the comparison process to increasing computational capacity via modifying the number of topics and having the topics, themselves, generated based on the lyrics. The number of words in each topic may be determined in a variety of ways now known or future developed. For example, the number of words per topic may be determined based on the total vocabulary of all analyzed lyrics. In an alternative example, the number of words per topic may be arbitrarily set.

An example of 10 topics, each displaying the 10 most frequently found words, generated from a corpus of approximately 613,000 songs using LDA, may be seen in FIG. 4. As may be appreciated, the words in different topics may overlap. For example, topics 3, 4, and 5 in FIG. 4 each contain the word "back," but those topics do not appear to be overall similar. As noted above, the top words of a topic are those most likely to be found together and, when found together, indicate a track's association with that topic.

The generated topics are then used by the lyrics vector generator 210 to generate an n-dimensional vector for each set of processed lyrics of tracks 206, describing that track's association with each of the topics. The number of dimensions (n) is equal to the number of topics. In the example set of topics found in FIG. 4, the lyrics vector generator 210 would generate a 10-dimensional vector for each track, showing the relationship between the processed lyrics of tracks 206 and each of the topics. These lyrics vectors 214 may be stored in a lyrics vector database 128 for later use.

The lyrics vectors 214 generated by the lyrics vector generator 210 may be used to determine whether a track should be considered explicit and generate a track explicitness indicator 322. As noted above, the definition of "explicitness" may vary widely. In one example, it may include only tracks containing certain words deemed offensive. In another example, it may include sexually suggestive tracks, whether those tracks contain certain words or not. In yet another example, it may include tracks espousing ideas or concepts of concern. Such ideas or concepts may be political, ideological, or otherwise concerning to a given user.

The training explicitness predictor 318 may receive lyrics vectors 214 generated by the lyrics vector generator 210 with appropriate pre-generated explicitness indicators 316 for a training set of tracks, some considered explicit and some, not. Using the explicitness indicators 316, the training explicitness predictor 318 trains an explicitness classifier. Training a classifier may be done in a variety of ways, including a Random Forest classifier, Naïve Bayes classifier, a Decision Tree classifier, a Stochastic Gradient Descent classifier, a K-Nearest Neighbor classifier, or other classification models now known or future developed. In the present embodiment, the classifier is applied to the lyrics vectors 214 received from the lyrics vector generator 210 for each of the training tracks for which training explicitness indicators 316 for tracks has been received. Through the process of training the classifier, the classifier learns which topics are considered explicit. The explicitness classifier is then used by the explicitness predictor 320.

The received explicitness indicators 316 for tracks may come from any of a variety of sources. Training track explicitness indicators 316 may come from titles of playlists for which users have created playlists. For example, the training tracks may come from songs commonly associated with playlists containing the words "explicit," or "sex," or other indicators of explicitness for a given determination. Advantages for using playlist title-generated training data include the ability to include a large dataset and reflect average users' perception of explicit tracks. Disadvantages of using playlist titles include the fact that many playlists containing explicit music are not titled with any form of indicator of such explicitness. Thus, false negatives may be common. Explicitness indicators 316 of training tracks may also come from expert analysis of tracks. Advantages to using expert analysis of training tracks include a higher degree of repeatability and consistency between tracks. Using expert-based analysis also allows the administrators of the system to more carefully curate what form of explicitness the classifier will identify. This careful curation may allow the system to offer users various forms of explicitness notifications for the plurality of tracks 202.

The classifier is then used by the explicitness predictor 320 to predict whether each track of the plurality of tracks 202 is explicit by comparing the explicitness classifier to the lyrics vector 214 for each of the plurality of tracks 202. In this way, for each of the plurality of tracks 202, a track explicitness indicator 322 is generated and may be stored in system in, for example, the track database 114.

In one alternative embodiment, the training explicitness predictor 318 may train multiple classifiers using different classifier methods. For example, the training explicitness predictor may train two classifiers: one, a Random Forest classifier and the second, a Naïve Bayes classifier. The explicitness predictor 320 may then use the multiple explicitness classifiers to each predict whether a given tag applies to each of the plurality of tracks 202 is explicit. The explicitness predictor 320 may then combine the predicted explicitness indicators from the multiple explicitness classifiers to generate a final set of explicitness indicators 322 that may be stored in the track database 114. The predicted explicitness indicators of each of the multiple classifiers may be combined in a variety of ways now known or future developed. For example, the explicitness predictor 320 may use the intersection of the explicitness indicators to generate the final set of explicitness indicators 322. In this way, only tracks labeled explicit by all classifiers would be included in the final set of track explicitness indicators 322. Alternatively, the explicitness predictor 320 may use the union of the explicitness indicators to generate the final set of track explicitness indicators 322. In this way, if any of the multiple classifiers would deem a given track explicit, the track would be indicated as explicit in the final set of track explicitness indicators 322. Other methods to combine explicitness indicators from multiple classifiers may also be applied.

In another alternative embodiment, the training explicitness predictor 318 may, in addition to the lyrics vectors 214, also receive acoustic vectors 212 for each of the plurality of tracks 202. An acoustic vector 212 is another multi-dimensional vector representing the association between the track and a set of acoustic features, based on the non-lyrical audio features of the track. For example, the acoustic vector 212 may be a seven-dimensional vector. The training explicitness predictor 318 may then use the combination of lyrics vector 214 and acoustic vector 212 for each of the training set of tracks to train an explicitness classifier. One example of such a combination of lyrics vectors and acoustic vectors may be to concatenate the vectors into a hybrid vector prior to training the explicitness classifier. The training explicitness predictor 318 may then use the hybrid classifier to train one or more classifiers. The explicitness predictor 320 may then use the hybrid vector-based classifiers to predict whether each track of the plurality of tracks 202 should be considered explicit by comparing the one or more classifiers to a similar, hybrid vector for each of the plurality of tracks 202. In this way, for each of the plurality of tracks 202, a set of track explicitness indicators 322 is generated and stored within the system in, for example, the track database 114.

Use of the acoustic vector 212, combined with the lyrics vector 214, offers additional benefits in predicting explicitness for tracks. For example, many songs with explicit concepts, rather than strictly explicit words, may contain similar acoustic features and thus have similar acoustic vectors. For example, many "club" songs may have similar acoustic features, such as a fast, energetic beat and may have similarly high likelihood of explicit concepts such as sex, drugs, or alcohol.

Process for Generating a Playlist

Figure 6:
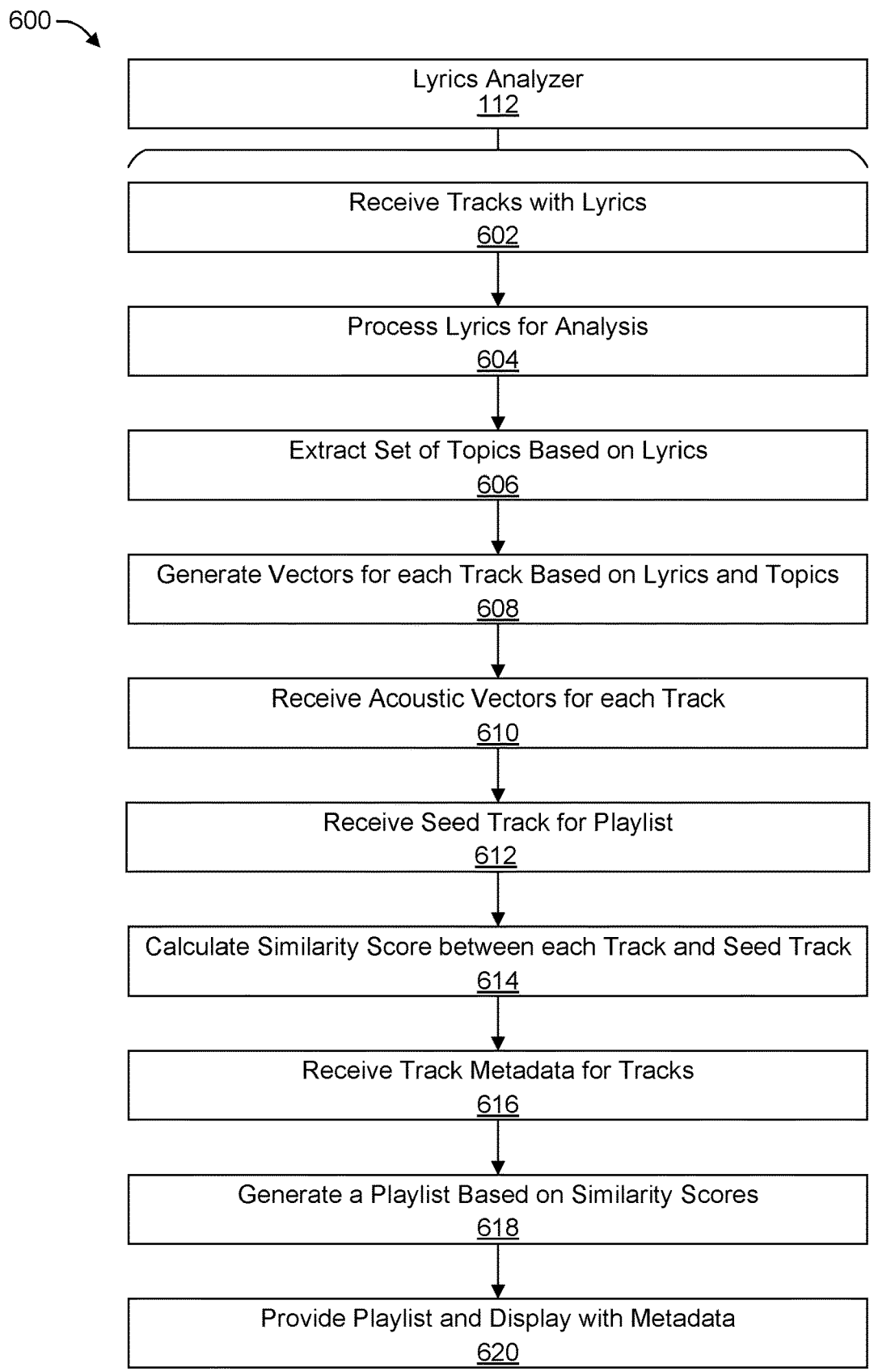
FIG. 6 depicts an example process for generating a playlist in accordance with an example embodiment of the present invention.

FIG. 6 illustrates a process 600 for generating a playlist by generating and using lyrics vectors in accordance with an example embodiment. The process is performed by various components, such as the components described above in connection with the lyrics analyzer 112. The process begins by receiving a plurality of tracks 202 having lyrics, as shown in step 602. Lyrics may be audio-to-text transcribed, may come, separately, in another file, or may be supplied in some other way. This plurality of tracks 202 with any accompanying lyrics may be stored in a track database 114.

The lyrics analyzer 112 may then process the lyrics for analysis at process step 604. Processing lyrics for analysis in step 604 is optional, as analyzing lyrics may operate well without doing so, but may, in some circumstances, work better with pre-processing. For example, the processing lyrics for analysis in step 604 may include white-space standardizing the lyrics, which may include converting some or all whitespace characters to a standard character for more consistent comparison of lyrics, removing excess whitespace characters, splitting certain compound words by inserting whitespace, or other forms of standardization. Preprocessing in step 604 may also include lowercasing all letters in lyrics to more efficiently compare words. Preprocessing in step 604 may also include removing stopwords. Removing stopwords may include removing very common words with no comparison value, such as "the" or "and" or "is," that do not aid in determining the content of lyrics. Preprocessing in step 604 may also include removing punctuation, such as commas, semicolons, dashes, periods, or other such marks. Preprocessing in step 604 may also include lemmatizing the words of the lyrics. Lemmatization may include converting all inflections of a word to the base form of the word. For example, the words "walked," "walks," and "walking," are all inflections of the word "walk," and through lemmatization, the system may convert all such forms to the base form for more uniform comparison of lyrics. Preprocessing in step 604 may also include removing character repetition based on a dictionary. Finally, preprocessing in step 604 may include any combination of the above-mentioned forms of preprocessing. Preprocessing in step 604 is optional.

At operation 606, the lyrics analyzer 112 extracts a set of topics based on the lyrics of the received tracks. In one example, the lyrics analyzer 112 extracts topics through the use of the Latent Dirichlet Allocation (LDA) model. In other examples, a different generative statistical model may be used. Each topic extracted in operation 606 contains a number of words. The top words in each topic represent words that are commonly found together within a set of lyrics. The number of topics extracted in operation 606 is a set value that may be varied, based on desired computational complexity and sophistication, or other factors. Generally, the more topics extracted, the more computationally complex this and other operations within process 600 will be, but the operation will tend toward lower perplexity in its ultimate results. Such scalability to computational power, based on the number of topics, is a feature of the present invention.

At operation 608, the lyrics analyzer 112 generates an n-dimensional vector for each track based on lyrics and topics. The number of dimensions in the generated vector is generally the same as the number of topics extracted in operation 606. For example, a vector for the 10 topics shown in FIG. 4, would generally be a 10-dimensional vector. In the vector, each dimension represents the track's relationship to given topic. For example, if the lyrics of the track closely match the words found in a given topic, then that dimensional value of the vector will reflect that close association, and vice versa, for each of the extracted topics.

At operation 610, the lyrics analyzer may receive an acoustic vector for each track. This step is an optional step that may or may not be performed for a given analysis. Such acoustic vectors may be stored in an acoustic vector database 132. An acoustic vector 212 is another multi-dimensional vector representing the association between the track and a set of acoustic features, based on the non-lyrical audio features of the track. For example, the acoustic vector 212 may be a seven-dimensional vector.

At operation 612, the lyrics analyzer 112 receives a seed track for the desired playlist. The playlist seed track represents what song to which the other songs in a playlist should be similar.

At operation 614, the lyrics analyzer 112 calculates a similarity score between each track received and the seed track for the playlist. In one example, the similarity score may be calculated by comparing the lyrics vector of each received track to the lyrics vector of the seed track using a cosine distance comparison. In another example, the similarity score may be calculated by first generating a hybrid vector for each received track and seed track by concatenating the track's lyrics vector and the track's acoustic vector and then comparing the hybrid vector of each received track to the hybrid vector of the seed track using a cosine distance comparison.

In operation 616, the lyrics analyzer 112 receives track metadata. Such metadata may include information such as track artist, length, publication year, etc. Metadata may also include tags generated for each track, such as genre, occasions, or other tags such as, for example, those found in FIG. 5.

In operation 618, the lyrics analyzer 112 generates a playlist based on similarity scores. Using the calculated similarity between each received track and the seed track, the lyrics analyzer determines which tracks to include within the playlist, based on the number of songs desired. The process of operation 618 may include additional factors, including randomness, artist, genre, publication data, or other track metadata.

In operation 620, the lyrics analyzer 112 provides the playlist with the selected tracks and metadata for selected tracks for display to the playlist requester. The playlist may be, for example, transmitted to a media playback device 102 via a network 110.

Process for Generating Tags for Tracks

Figure 7:
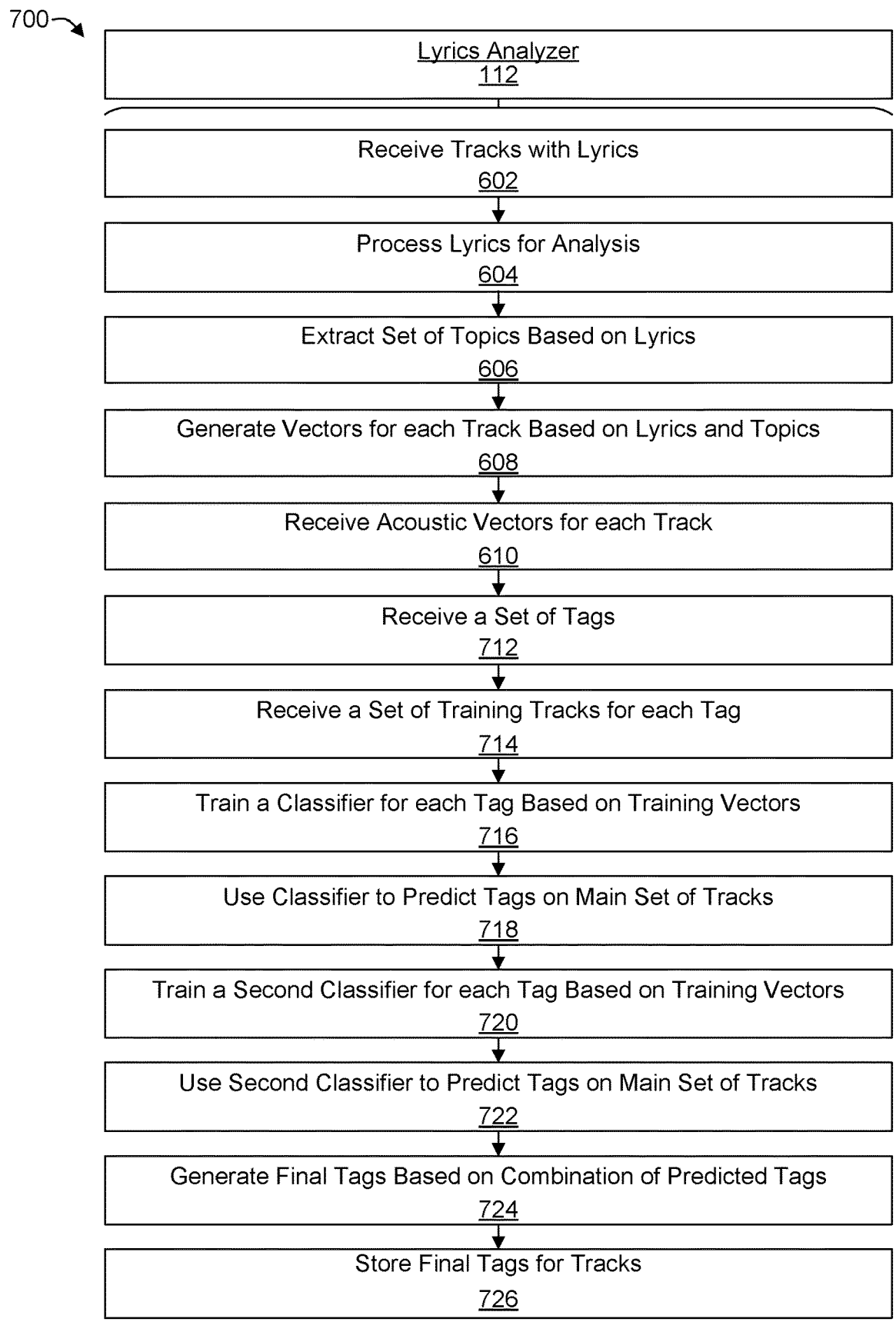
FIG. 7 depicts an example process for predicting tags for a set of tracks in accordance with an example embodiment of the present invention.

FIG. 7 illustrates a process 700 for generating a set of tags for a plurality of tracks by generating and using lyrics vectors in accordance with an example embodiment. The process is performed by various components, such as the components described above in connection with the lyrics analyzer 112. The process begins by receiving a plurality of tracks with lyrics at operation 602, similar to the process found in FIG. 6. This received plurality of tracks with lyrics at operation 602 may be stored in a track database 114.

The lyrics analyzer 112 may then process the lyrics for analysis at process step 604. Processing lyrics for analysis in step 604 is optional, as analyzing lyrics may operate well without doing so, but may, in some circumstances, work better with pre-processing. For example, the processing lyrics for analysis in step 604 may include white-space standardizing the lyrics, which may include converting some or all whitespace characters to a standard character for more consistent comparison of lyrics, removing excess whitespace characters, splitting certain compound words by inserting whitespace, or other forms of standardization. Preprocessing 604 may also include lowercasing all letters in lyrics to more efficiently compare words. Preprocessing 604 may also include removing stopwords. Removing stopwords may include removing very common words with no comparison value, such as "the" or "and" or "is," that do not aid in determining the content of lyrics. Preprocessing 604 may also include removing punctuation, such as commas, semicolons, dashes, periods, or other such marks. Preprocessing 604 may also include lemmatizing the words of the lyrics. Lemmatization may include converting all inflections of a word to the base form of the word. For example, the words "walked," "walks," and "walking," are all inflections of the word "walk," and through lemmatization, the system may convert all such forms to the base form for more uniform comparison of lyrics. Preprocessing 604 may also include removing character repetition based on a dictionary. Finally, preprocessing 604 may include any combination of the above-mentioned forms of preprocessing. Preprocessing 604 is optional.

At operation 606, the lyrics analyzer 112 extracts a set of topics based on the lyrics of the received tracks. In one example, the lyrics analyzer 112 extracts topics through the use of the Latent Dirichlet Allocation (LDA) model. In other examples, a different generative statistical model may be used. Each topic extracted in operation 606 contains a number of words. The words in each topic represent words that are commonly found together within a set of lyrics. The number of topics extracted in operation 606 is a set value that may be varied, based on desired computational complexity and sophistication, or other factors. Generally, the more topics extracted, the more computationally complex this and other operations within process 700 will be, but the operation will tend toward lower perplexity in its ultimate results. Such scalability to computational power, based on the number of topics, is a feature of the present invention.

At operation 608, the lyrics analyzer 112 generates an n-dimensional vector for each track based on lyrics and topics. The number of dimensions in the generated vector is generally the same as the number of topics extracted in operation 606. For example, a vector for the 10 topics shown in FIG. 4, would generally be a 10-dimensional vector. In the vector, each dimension represents the track's relationship to given topic. For example, if the lyrics of the track closely match the words found in a given topic, then that dimensional value of the vector will reflect that close association, and vice versa, for each of the extracted topics.

At operation 610, the lyrics analyzer may receive an acoustic vector for each track. This step is an optional step that may or may not be performed for a given analysis. Such acoustic vectors may be stored in an acoustic vector database 132. An acoustic vector 212 is another multi-dimensional vector representing the association between the track and a set of acoustic features, based on the non-lyrical audio features of the track. For example, the acoustic vector 212 may be a seven-dimensional vector.

At operation 712, the lyrics analyzer 112 receives a set of tags that it will later apply to the received tracks.

At operation 714, the lyrics analyzer 112 receives a set of training tracks for each of the tags received in operation 712. The training tracks for each tag includes songs to which the tag applies and may include songs to which the tag does not apply.

The tags for the training tracks received in operation 714 may come from any of a variety of sources. Training tracks and tags may come from titles of playlists for which users have already created playlists. For example, the training tracks may come from songs commonly associated with playlists containing the words "Christmas," "driving," "dance," romance," or any other tag of interest. Advantages for using playlist title-generated training tags include the ability to include a large dataset and reflect average users' desired tags without requiring additional effort on the part of administrators of the system. Further advantages include the ability to re-run tag generation to reflect changing musical tastes as user perception of tracks evolves. For example, Taylor Swift's music may have once been perceived as being within the "Country" genre, but user perception may have, over time, come to classify her entire catalogue as "Pop." Using user-generated playlists to generate tags may reflect these types of changes in perception over time. Using tags based on playlists also allows the creation of new tags based on new slang terms as they enter popular use. Training tracks and tags received in operation 714 may also come from expert analysis of tracks and generation of associated tags. Advantages to using expert-based tags of training tracks include a higher degree of repeatability and consistency between tracks. Using expert-based tags also allows the administrators of the system to more carefully curate tags for which the system will generate tags. This careful curation may save embarrassment or scandal from wildly inappropriate or derogatory tags.

At operation 716, the lyrics analyzer 112 trains a classifier for each tag received in operation 712. Training in operation 716 is based on the vector generated in operation 608 and the training data received in operation 714. Training in operation 716 may also be based on the acoustic vector received in operation 610, such as by concatenating the lyrics vector and acoustic vector into a hybrid vector. Training a classifier, generally, is known in the art and may be done in a variety of ways now known or future developed, including a Random Forest classifier, Naïve Bayes classifier, a Decision Tree classifier, a Stochastic Gradient Descent classifier, a K-Nearest Neighbor classifier, or other classification models now known or future developed. The classifier is applied to the lyrics vectors generated in operation 608 or to a hybrid vector combining the lyrics vector received in operation 608 and the acoustic vector received in operation 610 for each of the training tracks received in operation 714. Through the process of training the classifier, the classifier learns which topics are more or less associated with a given tag.

At operation 718, the lyrics analyzer 112 uses the set of classifiers trained in operation 716 to predict a set of tags for each of the received tracks. In operation 718, the lyrics analyzer 112 operates each classifier on the lyrics vector or combination of lyrics vector and acoustic vector for each track to determine whether the tag associated with the classifier is appropriate for that track. In this way, the lyrics analyzer generates a set of tags for each track. This set of tags may serve as the final set of tags.

In operation 720, the lyrics analyzer 112 may train a second classifier for each tag received in operation 712. This process is identical to that described for operation 716, but with a different type of classifier.

In operation 722, the lyrics analyzer 112 may use the second set of classifiers trained in operation 720 to predict a second set of tags for each of the received tracks. This operation is identical to that described for operation 720, but with the second classifier.

In operation 724, the lyrics analyzer 112 may generate a final set of tags based on the combination of the tags generated in operation 718 and the tags generated in operation 722. The predicted tags of each of the classifiers may be combined in a variety of ways now known or future developed. For example, combination may be based on the intersection of the predicted tags for each tag received in operation 712 to generate the final set of track tags. In this way, only tags applied by both classifiers would be included in the final set of track tags. Alternatively the combination may be based on the union of the predicted tags for each tag received in operation 712 to generate the final set of track tags. In this way, all tags predicted by either of the classifiers would be included in the final set of track tags.

In operation 726, the lyrics analyzer 112 stores the final tags for each track. The final tags stored by operation 726 may be the tags generated in operation 718 or the combination of tags generated in operation 724 Such storage may be in a tags database 124, or in the track database 114, or in other storage locations.

Process for Generating an Explicitness Indicator for Tracks

Figure 8:
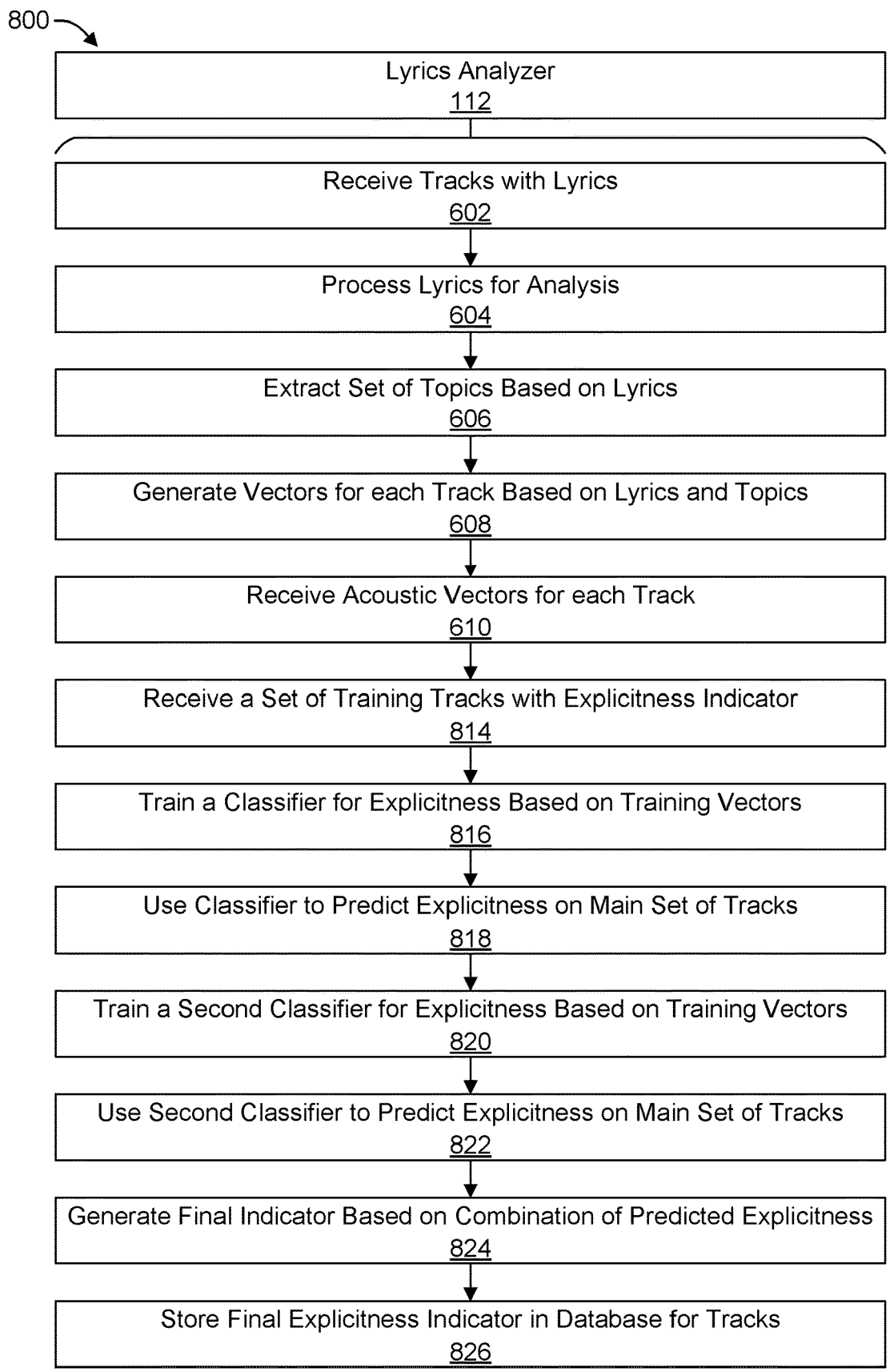
FIG. 8 depicts an example process for generating indicators of explicitness for a set of tracks in accordance with an example embodiment of the present invention.

FIG. 8 illustrates a process 800 for generating an explicitness indicator for a plurality of tracks by generating and using lyrics vectors. The process is performed by various components, such as the components described above in connection with the lyrics analyzer 112. The process begins by receiving a plurality of tracks with lyrics at operation 602, similar to the process found in FIG. 6. This received plurality of tracks with lyrics at operation 602 may be stored in a track database 114.

The lyrics analyzer 112 may then process the lyrics for analysis at process step 604. Processing lyrics for analysis in step 604 is optional, as analyzing lyrics may operate well without doing so, but may, in some circumstances, work better with pre-processing. For example, the processing lyrics for analysis in step 604 may include white-space standardizing the lyrics, which may include converting some or all whitespace characters to a standard character for more consistent comparison of lyrics, removing excess whitespace characters, splitting certain compound words by inserting whitespace, or other forms of standardization. Preprocessing in step 604 may also include lowercasing all letters in lyrics to more efficiently compare words. Preprocessing in step 604 may also include removing stopwords. Removing stopwords may include removing very common words with no comparison value, such as "the" or "and" or "is," that do not aid in determining the content of lyrics. Preprocessing in step 604 may also include removing punctuation, such as commas, semicolons, dashes, periods, or other such marks. Preprocessing in step 604 may also include lemmatizing the words of the lyrics. Lemmatization may include converting all inflections of a word to the base form of the word. For example, the words "walked," "walks," and "walking," are all inflections of the word "walk," and through lemmatization, the system may convert all such forms to the base form for more uniform comparison of lyrics. Preprocessing in step 604 may also include removing character repetition based on a dictionary. Finally, pre-processing in step 604 may include any combination of the above-mentioned forms of preprocessing. Preprocessing in step 604 is optional.

At operation 606, the lyrics analyzer 112 extracts a set of topics based on the lyrics of the received tracks. In one example, the lyrics analyzer 112 extracts topics through the use of the Latent Dirichlet Allocation (LDA) model. In other examples, a different generative statistical model may be used. Each topic extracted in operation 606 contains a number of words. The words in each topic represent words that are commonly found together within a set of lyrics. The number of topics extracted in operation 606 is a set value that may be varied, based on desired computational complexity and sophistication, or other factors. Generally, the more topics extracted, the more computationally complex this and other operations within process 800 will be, but the operation will tend toward lower perplexity in its ultimate results. Such scalability to computational power, based on the number of topics, is a feature of the present invention.

At operation 608, the lyrics analyzer 112 generates an n-dimensional vector for each track based on lyrics and topics. The number of dimensions in the generated vector is generally the same as the number of topics extracted in operation 606. For example, a vector for the 10 topics shown in FIG. 4, would generally be a 10-dimensional vector. In the vector, each dimension represents the track's relationship to given topic. For example, if the lyrics of the track closely match the words found in a given topic, then that dimensional value of the vector will reflect that close association, and vice versa, for each of the extracted topics.

At operation 610, the lyrics analyzer may receive an acoustic vector for each track. This step is an optional step that may or may not be performed for a given analysis. Such acoustic vectors may be stored in an acoustic vector database 132. An acoustic vector 212 is another multi-dimensional vector representing the association between the track and a set of acoustic features, based on the non-lyrical audio features of the track. For example, the acoustic vector 212 may be a seven-dimensional vector.

At operation 814, the lyrics analyzer 112 receives a set of training tracks. Each training track includes an indicator regarding whether the track is considered explicit or not.

The indicators for the training tracks received in operation 814 may come from any of a variety of sources. Training tracks and explicitness indicators may come from titles of playlists for which users have created playlists. For example, the training tracks may come from songs commonly associated with playlists containing the words "explicit," or "sex," or other indicators of explicitness for a given determination. Advantages for using playlist title-generated training data include the ability to include a large dataset and reflect average users' perception of explicit tracks. Disadvantages of using playlist titles include the fact that many playlists containing explicit music are not titled with any form of indicator of such explicitness. Thus, false negatives may be common. Indicators for explicitness received in operation 814 may also come from expert analysis of tracks. Advantages to using expert analysis of training tracks include a higher degree of repeatability and consistency between tracks. Using expert-based analysis also allows the administrators of the system to more carefully curate what form of explicitness the classifier will identify. This careful curation may allow the system to offer users various forms of explicitness notifications for the plurality of tracks received.

At operation 816, the lyrics analyzer 112 trains a classifier to determine whether a track is explicit or not. Training in operation 816 is based on the vector generated in operation 608 and the training data received in operation 814. Training in operation 816 may also be based on the acoustic vector received in operation 610, such as by concatenating the lyrics vector and acoustic vector into a hybrid vector. Training a classifier may be done in a variety of ways, including a Random Forest classifier, Naïve Bayes classifier, a Decision Tree classifier, a Stochastic Gradient Descent classifier, a K-Nearest Neighbor classifier, or other classification models now known or future developed. The classifier is applied to the lyrics vectors generated in operation 608 or to a hybrid vector combining the lyrics vector received in operation 608 and the acoustic vector received in operation 610 for each of the training tracks received in operation 814. Through the process of training the classifier, the classifier learns which topics are considered explicit.

At operation 818, the lyrics analyzer 112 uses the set of classifiers trained in operation 818 to predict the explicitness for each of the received tracks. In operation 818, the lyrics analyzer 112 operates each classifier on the lyrics vector or combination of lyrics vector and acoustic vector for each track to determine whether the track should be labeled as explicit. In this way, the lyrics analyzer generates an explicitness indicator for each track. This set of indicators may serve as the final set of indicators.

In operation 820, the lyrics analyzer 112 may train a second classifier to determine explicitness. This process is identical to that described for operation 816, but with a different type of classifier.

In operation 822, the lyrics analyzer 112 may use the second classifier trained in operation 820 to predict a second explicitness indicator for each of the received tracks. This operation is identical to that described for operation 820, but with the second classifier.

In operation 824, the lyrics analyzer 112 may generate a final explicitness indicator based on the combination of the indicator generated in operation 818 and the indicator generated in operation 822. The indicators generated by each of the classifiers may be combined in a variety of ways now known or future developed. For example, combination may be based on the intersection of the indicators to generate the final set of indicators. In this way, only tracks labeled explicit by both classifiers would be included in the final set of explicitness indicators. Alternatively the combination may be based on the union of the generated explicitness indicators. In this way, if either classifier deems a given track explicit, the track would be indicated as explicit in the final set of explicitness indicators.

In operation 826, the lyrics analyzer stores the final explicitness indicators. The final explicitness indicators stored by operation 826 may be the indicators generated in operation 818 or the combination of indicators generated in operation 824. Such storage may be in a tags database 124, or in the track database 114, or in other storage locations.

Device Environment

Figure 9:
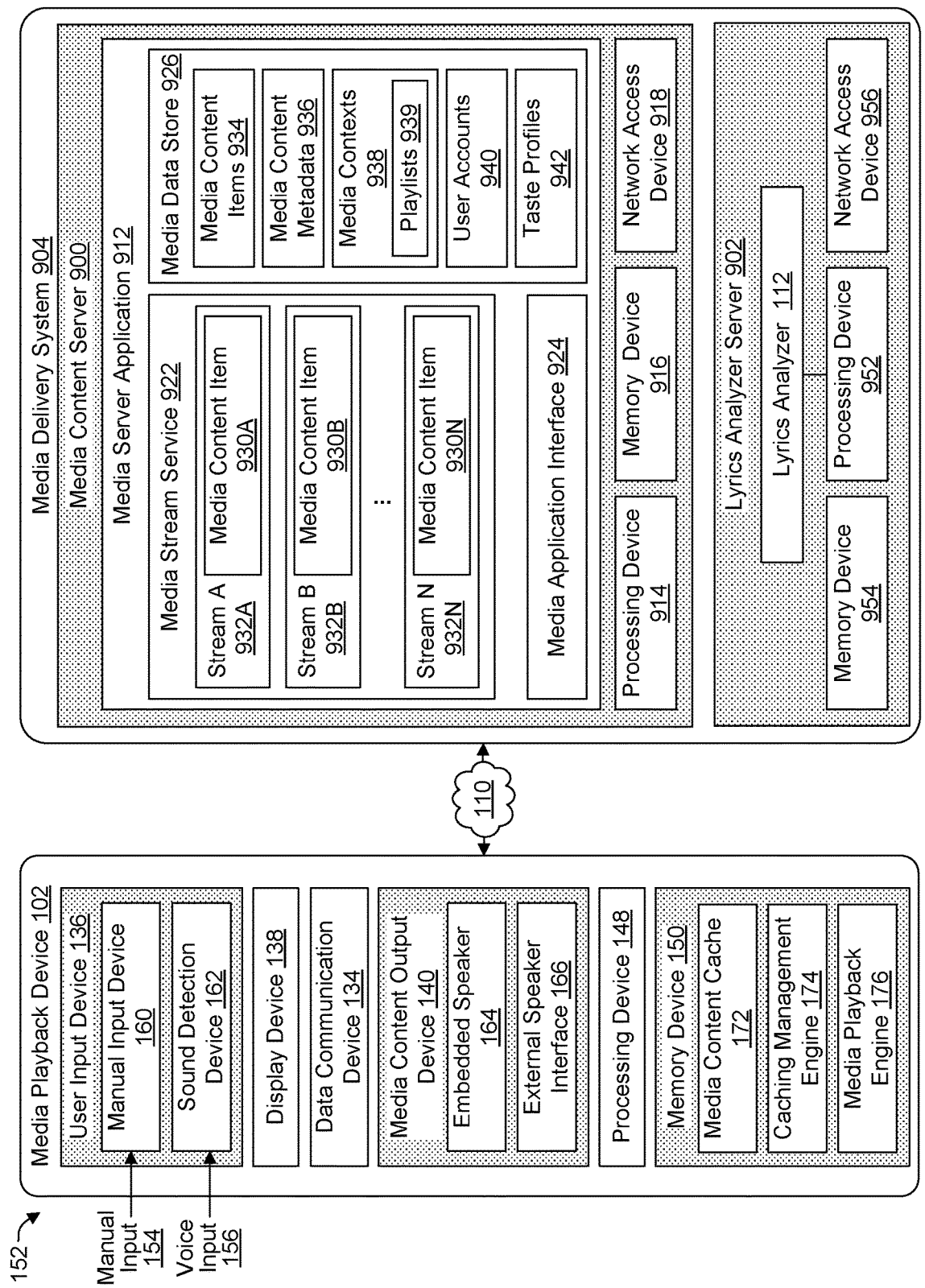
FIG. 9 is a block diagram of a media content provision system according to an example embodiment.

FIG. 9 is a block diagram of an example embodiment of the media playback device 102 of the media content provision system 100 shown in FIG. 1. In this example, the media playback device 102 includes a user input device 136, a display device 138, a data communication device 134, a media content output device 140, a processing device 148, and a memory device 150.

The media playback device 102 operates to play media content. For example, the media playback device 102 is configured to play media content that is provided (e.g., streamed or transmitted) by a system external to the media playback device 102, such as the media delivery system 904, another system, or a peer device. In other examples, the media playback device 102 operates to play media content stored locally on the media playback device 102. In yet other examples, the media playback device 102 operates to play media content that is stored locally as well as media content provided by other systems.

In some embodiments, the media playback device 102 is a handheld or portable entertainment device, smartphone, tablet, watch, wearable device, or any other type of computing device capable of playing media content. In other embodiments, the media playback device 102 is a laptop computer, desktop computer, television, gaming console, set-top box, network appliance, Blu-ray™ or DVD player, media player, stereo, or radio.

In some embodiments, the media playback device 102 is a system dedicated for streaming personalized media content in a vehicle environment.

The user input device 136 operates to receive a user input 152 for controlling the media playback device 102. As illustrated, the user input 152 can include a manual input 154 and a voice input 156. In some embodiments, the user input device 136 includes a manual input device 160 and a sound detection device 162.

The manual input device 160 operates to receive the manual input 154 for controlling playback of media content via the media playback device 102. In some embodiments, the manual input device 160 includes one or more buttons, keys, touch levers, switches, and/or other mechanical input devices for receiving the manual input 154. For example, the manual input device 160 includes a text entry interface, such as a mechanical keyboard, a virtual keyboard, or a handwriting input device, which is configured to receive a text input, such as a text version of the user query 118. In addition, in some embodiments, the manual input 154 is received for managing various pieces of information transmitted via the media playback device 102 and/or controlling other functions or aspects associated with the media playback device 102.

The sound detection device 162 operates to detect and record sounds from proximate the media playback device 102. For example, the sound detection device 162 can detect sounds including the voice input 156. In some embodiments, the sound detection device 162 includes one or more acoustic sensors configured to detect sounds proximate the media playback device 102. For example, acoustic sensors of the sound detection device 162 include one or more microphones. Various types of microphones can be used for the sound detection device 162 of the media playback device 102.

In some embodiments, the voice input 156 is a user's voice (also referred to herein as an utterance) for controlling playback of media content via the media playback device 102. For example, the voice input 156 includes a voice version of the user query 118 received from the sound detection device 162 of the media playback device 102. In addition, the voice input 156 is a user's voice for managing various data transmitted via the media playback device 102 and/or controlling other functions or aspects associated with the media playback device 102.

Referring still to FIG. 9, the display device 138 operates to display information. Examples of such information include media content playback information, notifications, and other information. In some embodiments, the display device 138 is configured as a touch sensitive display and includes the manual input device 160 of the user input device 136 for receiving the manual input 154 from a selector (e.g., a finger, stylus etc.) controlled by a user. In some embodiments, therefore, the display device 138 operates as both a display device and a user input device. The display device 138 operates to detect inputs based on one or both of touches and near-touches. In some embodiments, the display device 138 displays a graphical user interface for interacting with the media playback device 102. Other embodiments of the display device 138 do not include a touch sensitive display screen. Some embodiments include a display device and one or more separate user interface devices. Further, some embodiments do not include a display device.

The data communication device 134 operates to enable the media playback device 102 to communicate with one or more computing devices over one or more networks, such as the network 110. For example, the data communication device 134 is configured to communicate with the media delivery system 904 and receive media content from the media delivery system 904 at least partially via the network 110. The data communication device 134 can be a network interface of various types which connects the media playback device 102 to the network 110. Examples of the data communication device 134 include wired network interfaces and wireless network interfaces. Wireless network interfaces includes infrared, BLUETOOTH® wireless technology, 802.11a/b/g/n/ac, and cellular or other radio frequency interfaces in at least some possible embodiments. Examples of cellular network technologies include LTE, WiMAX, UMTS, CDMA2000, GSM, cellular digital packet data (CDPD), and Mobitex.

The media content output device 140 operates to output media content In some embodiments, the media content output device 140 includes one or more embedded speakers 164 which are incorporated in the media playback device 102.

Alternatively or in addition, some embodiments of the media playback device 102 include an external speaker interface 166 as an alternative output of media content. The external speaker interface 166 is configured to connect the media playback device 102 to another system having one or more speakers, such as headphones, a portable speaker, and a vehicle entertainment system, so that media output is generated via the speakers of the other system external to the media playback device 102. Examples of the external speaker interface 166 include an audio output jack, a USB port, a BLUETOOTH® transmitter, a display panel, and a video output jack. Other embodiments are possible as well. For example, the external speaker interface 166 is configured to transmit a signal that can be used to reproduce an audio signal by a connected or paired device such as headphones or a speaker.

The processing device 148, in some embodiments, includes one or more central processing units (CPU). In other embodiments, the processing device 148 additionally or alternatively includes one or more digital signal processors, field-programmable gate arrays, or other electronic circuits.

The memory device 150 typically includes at least some form of computer-readable media. The memory device 150 can include at least one data storage device. Computer readable media includes any available media that can be accessed by the media playback device 102. By way of example, computer-readable media includes computer readable storage media and computer readable communication media.

Computer readable storage media includes volatile and nonvolatile, removable and non-removable media implemented in any device configured to store information such as computer readable instructions, data structures, program modules, or other data. Computer readable storage media includes, but is not limited to, random access memory, read only memory, electrically erasable programmable read only memory, flash memory and other memory technology, compact disc read only memory, Blu-ray™ discs, digital versatile discs or other optical storage, magnetic storage devices, or any other medium that can be used to store the desired information and that can be accessed by the media playback device 102. In some embodiments, computer readable storage media is non-transitory computer readable storage media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The memory device 150 operates to store data and instructions. In some embodiments, the memory device 150 stores instructions for a media content cache 172, a caching management engine 174, and a media playback engine 176.

Some embodiments of the memory device 150 include the media content cache 172. The media content cache 172 stores media content items, such as media content items that have been received from the media delivery system 904. The media content items stored in the media content cache 172 may be stored in an encrypted or unencrypted format. In some embodiments, the media content cache 172 also stores metadata about media content items such as title, artist name, album name, length, genre, mood, era, etc. The media content cache 172 can further store playback information about the media content items and/or other information associated with the media content items.

The caching management engine 174 is configured to receive and cache media content in the media content cache 172 and manage the media content stored in the media content cache 172. In some embodiments, when media content is streamed from the media delivery system 904, the caching management engine 174 operates to cache at least a portion of the media content into the media content cache 172. In other embodiments, the caching management engine 174 operates to cache at least a portion of media content into the media content cache 172 while online so that the cached media content is retrieved for playback while the media playback device 102 is offline.

The media playback engine 176 operates to play media content. As described herein, the media playback engine 176 is configured to communicate with the media delivery system 904 to receive one or more media content items (e.g., through the media stream 932). In other embodiments, the media playback engine 176 is configured to play media content that is locally stored in the media playback device 102.

In some embodiments, the media playback engine 176 operates to retrieve one or more media content items that are either locally stored in the media playback device 102 or remotely stored in the media delivery system 904. In some embodiments, the media playback engine 176 is configured to send a request to the media delivery system 904 for media content items and receive information about such media content items for playback.

Referring still to FIG. 9, the media delivery system 904 includes a media content server 900, and a lyrics analyzer server 902.

The media delivery system 904 includes one or more computing devices and provides media content to the media playback device 102 and, in some embodiments, other media playback devices as well. In addition, the media delivery system 904 interacts with the media playback device 102 to provide the media playback device 102 with various functionalities.

In at least some embodiments, the media content server 900 and the lyrics analyzer server 902 are provided by separate computing devices. In other embodiments, the media content server 900 and the lyrics analyzer server 902 are provided by the same computing device(s). Further, in some embodiments, at least one of the media content server 900 and the lyrics analyzer server 902 is provided by multiple computing devices. For example, the media content server 900 and the lyrics analyzer server 902 may be provided by multiple redundant servers located in multiple geographic locations.

Although FIG. 9 shows a single media content server 900, and a single lyrics analyzer server 902, some embodiments include multiple media content servers and lyrics analyzer servers. In these embodiments, each of the multiple media content servers and lyrics analyzer servers may be identical or similar to the media content server 900 and the lyrics analyzer server 902, respectively, as described herein, and may provide similar functionality with, for example, greater capacity and redundancy and/or services from multiple geographic locations. Alternatively, in these embodiments, some of the multiple media content servers and/or the lyrics analyzer servers may perform specialized functions to provide specialized services. Various combinations thereof are possible as well.

The media content server 900 transmits stream media to media playback devices such as the media playback device 102. In some embodiments, the media content server 900 includes a media server application 912, a processing device 914, a memory device 916, and a network access device 918. The processing device 914 and the memory device 916 may be similar to the processing device 148 and the memory device 150, respectively, which have each been previously described. Therefore, the description of the processing device 914 and the memory device 916 are omitted for brevity purposes.

The network access device 918 operates to communicate with other computing devices over one or more networks, such as the network 110. Examples of the network access device include one or more wired network interfaces and wireless network interfaces. Examples of such wireless network interfaces of the network access device 918 include wireless wide area network (WWAN) interfaces (including cellular networks) and wireless local area network (WLANs) interfaces. In other examples, other types of wireless interfaces can be used for the network access device 918.

In some embodiments, the media server application 912 is configured to stream media content, such as music or other audio, video, or other suitable forms of media content. The media server application 912 includes a media stream service 922, a media application interface 924, and a media data store 926. The media stream service 922 operates to buffer media content, such as media content items 930A, 930B, and 930N (collectively 930), for streaming to one or more media streams 932A, 932B, and 932N (collectively 932).

The media application interface 924 can receive requests or other communication from media playback devices or other systems, such as the media playback device 102, to retrieve media content items from the media content server 900. For example, in FIG. 9, the media application interface 924 receives communication from the media playback device 102 to receive media content from the media content server 900.

In some embodiments, the media data store 926 stores media content items 934, media content metadata 936, media contexts 938, user accounts 940, and taste profiles 942. The media data store 926 may comprise one or more databases and file systems. Other embodiments are possible as well.

As discussed herein, the media content items 934 (including the media content items 930) may be audio, video, or any other type of media content, which may be stored in any format for storing media content.

The media content metadata 936 provides various information associated with the media content items 934. In addition or alternatively, the media content metadata 936 provides various information associated with the media contexts 938. In some embodiments, the media content metadata 936 includes one or more of title, artist name, album name, length, genre, mood, era, etc. In some embodiments, some or all of the media content metadata may be provided by the lyrics analyzer 112.

In some embodiments, the media content metadata 936 includes acoustic metadata, cultural metadata, and explicit metadata. The acoustic metadata may be derived from analysis of the track and refers to a numerical or mathematical representation of the sound of a track. Acoustic metadata may include temporal information such as tempo, rhythm, beats, downbeats, tatums, patterns, sections, or other structures. Acoustic metadata may also include spectral information such as melody, pitch, harmony, timbre, chroma, loudness, vocalness, or other possible features. Acoustic metadata may take the form of one or more vectors, matrices, lists, tables, and other data structures. Acoustic metadata may be derived from analysis of the music signal. One form of acoustic metadata, commonly termed an acoustic fingerprint, may uniquely identify a specific track. Other forms of acoustic metadata may be formed by compressing the content of a track while retaining some or all of its musical characteristics.

The cultural metadata refers to text-based information describing listeners' reactions to a track or song, such as styles, genres, moods, themes, similar artists and/or songs, rankings, etc. Cultural metadata may be derived from expert opinion such as music reviews or classification of music into genres. Cultural metadata may be derived from listeners through websites, chatrooms, blogs, surveys, and the like. Cultural metadata may include sales data, shared collections, lists of favorite songs, and any text information that may be used to describe, rank, or interpret music. Cultural metadata may also be generated by a community of listeners and automatically retrieved from Internet sites, chat rooms, blogs, and the like. Cultural metadata may take the form of one or more vectors, matrices, lists, tables, and other data structures. A form of cultural metadata particularly useful for comparing music is a description vector. A description vector is a multi-dimensional vector associated with a track, album, or artist. Each term of the description vector indicates the probability that a corresponding word or phrase would be used to describe the associated track, album or artist.

The explicit metadata refers to factual or explicit information relating to music. Explicit metadata may include album and song titles, artist and composer names, other credits, album cover art, publisher name and product number, and other information. Explicit metadata is generally not derived from the music itself or from the reactions or opinions of listeners.

At least some of the media content metadata 936, such as explicit metadata (names, credits, product numbers, etc.) and cultural metadata (styles, genres, moods, themes, similar artists and/or songs, rankings, etc.), for a large library of songs or tracks can be evaluated and provided by one or more third party service providers. Acoustic and cultural metadata may take the form of parameters, lists, matrices, vectors, and other data structures. Acoustic and cultural metadata may be stored as XML files, for example, or any other appropriate file type. Explicit metadata may include numerical, text, pictorial, and other information. Explicit metadata may also be stored in an XML or other file. All or portions of the metadata may be stored in separate files associated with specific tracks. All or portions of the metadata, such as acoustic fingerprints and/or description vectors, may be stored in a searchable data structure, such as a k-D tree or other database format.

Referring still to FIG. 9, each of the media contexts 938 is used to identify one or more media content items 934. In some embodiments, the media contexts 938 are configured to group one or more media content items 934 and provide a particular context to the group of media content items 934. Some examples of the media contexts 938 include albums, artists, playlists, and individual media content items. By way of example, where a media context 938 is an album, the media context 938 can represent that the media content items 934 identified by the media context 938 are associated with that album.

As described above, the media contexts 938 can include playlists 939. The playlists 939 are used to identify one or more of the media content items 934. In some embodiments, the playlists 939 identify a group of the media content items 934 in a particular order. In other embodiments, the playlists 939 merely identify a group of the media content items 934 without specifying a particular order. Some, but not necessarily all, of the media content items 934 included in a particular one of the playlists 939 are associated with a common characteristic such as a common genre, mood, or era. Embodiments for generating playlists are discussed, above, in relation to FIGS. 2 and 6.

In some embodiments, a user can listen to media content items in a playlist 939 by selecting the playlist 939 via a media playback device, such as the media playback device 102. The media playback device then operates to communicate with the media delivery system 904 so that the media delivery system 904 retrieves the media content items identified by the playlist 939 and transmits data for the media content items to the media playback device for playback.

At least some of the playlists 939 may include user-created playlists. For example, a user of a media streaming service provided using the media delivery system 904 can create a playlist 939 and edit the playlist 939 by adding, removing, and rearranging media content items in the playlist 939. A playlist 939 can be created and/or edited by a group of users together to make it a collaborative playlist. In some embodiments, user-created playlists can be available to a particular user only, a group of users, or to the public based on a user-definable privacy setting.

In some embodiments, when a playlist is created by a user or a group of users, the media delivery system 904 operates to generate a list of media content items recommended for the particular user or the particular group of users. In some embodiments, such recommended media content items can be selected based at least on the taste profiles 942 as described herein. Other information or factors can be used to determine the recommended media content items. Examples of determining recommended media content items are described in U.S. patent application Ser. No. 15/858,377, titled MEDIA CONTENT ITEM RECOMMENDATION SYSTEM, filed Dec. 29, 2017, the disclosure of which is hereby incorporated by reference in its entirety.

In addition or alternatively, at least some of the playlists 939 are created by a media streaming service provider. For example, such provider-created playlists can be automatically created by the media delivery system 904, through the use of the lyrics analyzer 112, as described in relation to FIGS. 2 and 6. In some embodiments, a provider-created playlist can be customized to a particular user or a particular group of users. In another example, a playlist for a particular user can be automatically created by the media delivery system 904 based on the user's listening history (e.g., the user's taste profile) and/or listening history of other users with similar tastes. In other embodiments, a provider-created playlist can be configured to be available for the public in general. Provider-created playlists can also be sharable with other users.

The user accounts 940 are used to identify users of a media streaming service provided by the media delivery system 904. In some embodiments, a user account 940 allows a user to authenticate to the media delivery system 904 and enable the user to access resources (e.g., media content items, playlists, etc.) provided by the media delivery system 904. In some embodiments, the user can use different devices to log into the user account and access data associated with the user account in the media delivery system 904. User authentication information, such as a username, an email account information, a password, and other credentials, can be used for the user to log into his or her user account. It is noted that, where user data is to be protected, the user data is handled according to robust privacy and data protection policies and technologies. For instance, whenever personally identifiable information and any other information associated with users is collected and stored, such information is managed and secured using security measures appropriate for the sensitivity of the data. Further, users can be provided with appropriate notice and control over how any such information is collected, shared, and used.

The taste profiles 942 contain records indicating media content tastes of users. A taste profile can be associated with a user and used to maintain an in-depth understanding of the music activity and preference of that user, enabling personalized recommendations, taste profiling and a wide range of social music applications. Libraries and wrappers can be accessed to create taste profiles from a media library of the user, social website activity and other specialized databases to obtain music preferences.

In some embodiments, each taste profile 942 is a representation of musical activities, such as user preferences and historical information about the users' consumption of media content, and can include a wide range of information such as artist plays, song plays, skips, dates of listen by the user, songs per day, playlists, play counts, start/stop/skip data for portions of a song or album, contents of collections, user rankings, preferences, or other mentions received via a client device, or other media plays, such as websites visited, book titles, movies watched, playing activity during a movie or other presentations, ratings, or terms corresponding to the media, such as "comedy," etc.

In addition, the taste profiles 942 can include other information. For example, the taste profiles 942 can include libraries and/or playlists of media content items associated with the user. The taste profiles 942 can also include information about the user's relationships with other users (e.g., associations between users that are stored by the media delivery system 904 or on a separate social media site).

The taste profiles 942 can be used for a number of purposes. One use of taste profiles is for creating personalized playlists (e.g., personal playlisting). An API call associated with personal playlisting can be used to return a playlist customized to a particular user. For example, the media content items listed in the created playlist are constrained to the media content items in a taste profile associated with the particular user. Another example use case is for event recommendation. A taste profile can be created, for example, for a festival that contains all the artists in the festival. Music recommendations can be constrained to artists in the taste profile. Yet another use case is for personalized recommendation, where the contents of a taste profile are used to represent an individual's taste. This API call uses a taste profile as a seed for obtaining recommendations or playlists of similar artists. Yet another example of taste profile use case is referred to as bulk resolution. A bulk resolution API call is used to resolve taste profile items to pre-stored identifiers associated with a service, such as a service that provides metadata about items associated with the taste profile (e.g., song tempo for a large catalog of items). Yet another example use case for taste profiles is referred to as user-to-user recommendation. This API call is used to discover users with similar tastes by comparing the similarity of taste profile item(s) associated with users.

A taste profile 942 can represent a single user or multiple users. Conversely, a single user or entity can have multiple taste profiles 942. For example, one taste profile can be generated in connection with a user's media content play activity, whereas another separate taste profile can be generated for the same user based on the user's selection of media content items and/or artists for a playlist.

Referring still to FIG. 9, the lyrics analyzer server 902 operates to analyze lyrics in order to generate playlists, predict tags for tracks, and generate indicators of explicitness for tracks (FIGS. 1-8). In some embodiments, the lyrics analyzer server 902 includes a lyrics analyzer 112, a processing device 952, a memory device 954, and a network access device 956. The processing device 952, the memory device 954, and the network access device 956 may be similar to the processing device 914, the memory device 916, and the network access device 918, respectively, which have each been previously described.

In some embodiments, the lyrics analyzer 112 operates to interact with the media playback device 102 and provide a playlist in response to a seed song 120 or search results in response to a query 118. The lyrics analyzer 112 can interact with other servers, such as the media content server 900 to receive tracks or training metadata to perform lyrics analysis.

What is claimed is:
1. A method, comprising:
receiving a plurality of tracks at an information storage and retrieval platform via an electronic communication from a datastore of tracks, the plurality of tracks including spoken words;
extracting n topics summarizing the spoken words of the plurality of tracks, each topic consisting of a plurality of words found together within the spoken words of the plurality of tracks, where n is an integer;
receiving a seed track from among the plurality of tracks;
receiving, for at least one of the plurality of tracks, a seed track lyrics vector;
calculating a similarity score for each of the plurality of tracks to the seed track, based on their respective n-dimensional lyrics vectors, thereby generating a plurality of similarity scores, wherein calculating the similarity score for at least one of the plurality of tracks further includes calculating the similarity between the lyrics vector of the seed track and the lyrics vector of at least one of the plurality of tracks;
predicting, based on the n-dimensional lyrics vectors, a set of track tags for each of the plurality of tracks;
identifying one or more similar track tags from among the set of track tags for each of the plurality of tracks; and
generating a playlist of tracks based on the plurality of similarity scores and the one or more similar track tags.

2. The method according to claim 1, wherein extracting n topics summarizing the spoken words of the plurality of tracks comprises using a generative statistical model; and
the generative statistical model is a Latent Dirichlet Allocation (LDA) model.

3. The method according to claim 1, wherein calculating a similarity score includes calculating a cosine distance.

4. The method according to claim 1, further comprising:
processing the spoken words of the plurality of tracks, wherein the processing includes: (i) white-space standardizing, (ii) lowercasing, (iii) removing stopwords, (iv) removing punctuation, (v) lemmatizing, (vi) removing character repetition based on a dictionary, or (vii) any combination of (i), (ii), (iii), (iv), (v), and (vi).

5. The method according to claim 1, wherein calculating a similarity score further includes comparing a hybrid vector of at least one of the plurality of tracks to a hybrid vector of the seed track.

6. A method, comprising:
receiving a plurality of tracks at an information storage and retrieval platform via an electronic communication from a datastore of tracks, the plurality of tracks including spoken words;
extracting n topics summarizing the spoken words of the plurality of tracks, each topic consisting of a plurality of words found together within the spoken words of the plurality of tracks, where n is an integer;
generating, for each of the plurality of tracks, an n-dimensional lyrics vector using a generative statistical model based on the association of the spoken words of the track with the n topics, thereby generating a plurality of n-dimensional lyrics vectors;
receiving a seed track from among the plurality of tracks;
calculating a similarity score for each of the plurality of tracks to the seed track, based on their respective n-dimensional lyrics vectors, thereby generating a plurality of similarity scores;
predicting, based on the n-dimensional lyrics vectors, a set of track tags for each of the plurality of tracks;

identifying one or more similar track tags from among the set of track tags for each of the plurality of tracks;

obtaining, for each track of the plurality of tracks, track metadata including: (i) at least one tag based on a playlist title, (ii) a title, (iii) an album identifier, (iv) an artist name, (v) a value representing popularity, (vi) a plurality of audio features, (vii) one or more genres, (viii) a sentiment score, or (ix) any combination of (i), (ii), (iii), (iv), (v), (vi), (vii) and (viii); and generating a playlist of tracks based on the plurality of similarity scores and the one or more similar track tags.

7. The method according to claim 6, further comprising: displaying the track metadata for at least one of the plurality of tracks.

8. The method according to claim 6, wherein extracting n topics summarizing the spoken words of the plurality of tracks comprises using a generative statistical model; and
the generative statistical model is a Latent Dirichlet Allocation (LDA) model.

9. The method according to claim 6, wherein calculating a similarity score includes calculating a cosine distance.

10. The method according to claim 6, further comprising: processing the spoken words of the plurality of tracks, wherein the processing includes: (i) white-space standardizing, (ii) lowercasing, (iii) removing stopwords, (iv) removing punctuation, (v) lemmatizing, (vi) removing character repetition based on a dictionary, or (vii) any combination of (i), (ii), (iii), (iv), (v), and (vi).

11. The method according to claim 6, further comprising receiving, for at least one of the plurality of tracks, a seed track lyrics vector; and
wherein calculating the similarity score for at least one of the plurality of tracks further includes calculating the similarity between the lyrics vector of the seed track and the lyrics vector of at least one of the plurality of tracks.

12. The method according to claim 11, wherein calculating a similarity score further includes comparing a hybrid vector of at least one of the plurality of tracks to a hybrid vector of the seed track.

13. A system, comprising:
a computer-readable memory storing executable instructions; and
one or more processors in communication with the computer-readable memory, wherein, when the one or more processors execute the executable instructions, the one or more processors perform:
receiving a plurality of tracks at an information storage and retrieval platform via an electronic communication from a datastore of tracks, the plurality of tracks including spoken words;
extracting n topics summarizing the spoken words of the plurality of tracks, each topic consisting of a plurality of words found together within the spoken words of the plurality of tracks, where n is an integer;
generating, for each of the plurality of tracks, an n-dimensional lyrics vector using a generative statistical model based on the association of the spoken words of the track with the n topics, thereby generating a plurality of n-dimensional lyrics vectors;
receiving a seed track from among the plurality of tracks;
receiving, for at least one of the plurality of tracks, a seed track lyrics vector;
calculating a similarity score for each of the plurality of tracks to the seed track, based on their respective n-dimensional lyrics vectors, thereby generating a plurality of similarity scores, wherein calculating the similarity score for at least one of the plurality of tracks further includes calculating the similarity between the lyrics vector of the seed track and the lyrics vector of at least one of the plurality of tracks;

predicting, based on the n-dimensional lyrics vectors, a set of track tags for each of the plurality of tracks;

identifying one or more similar track tags from among the set of track tags for each of the plurality of tracks; and generating a playlist of tracks based on the plurality of similarity scores and the one or more similar track tags.

14. The system of claim 13, wherein extracting n topics summarizing the spoken words of the plurality of tracks comprises using a generative statistical model; and
the generative statistical model is a Latent Dirichlet Allocation (LDA) model.

15. The system of claim 13, wherein calculating a similarity score includes calculating a cosine distance.

16. The system of claim 13, wherein the one or more processors, when executing the executable instructions, further perform:
processing the spoken words of the plurality of tracks, wherein the processing includes: (i) white-space standardizing, (ii) lowercasing, (iii) removing stopwords, (iv) removing punctuation, (v) lemmatizing, (vi) removing character repetition based on a dictionary, or (vii) any combination of (i), (ii), (iii), (iv), (v), and (vi).

17. The system of claim 13, wherein calculating a similarity score further includes comparing a hybrid vector of at least one of the plurality of tracks to a hybrid vector of the seed track.

18. A system, comprising:
a computer-readable memory storing executable instructions; and
one or more processors in communication with the computer-readable memory, wherein, when the one or more processors execute the executable instructions, the one or more processors perform:
receiving a plurality of tracks at an information storage and retrieval platform via an electronic communication from a datastore of tracks, the plurality of tracks including spoken words;
extracting n topics summarizing the spoken words of the plurality of tracks, each topic consisting of a plurality of words found together within the spoken words of the plurality of tracks, where n is an integer;
generating, for each of the plurality of tracks, an n-dimensional lyrics vector using a generative statistical model based on the association of the spoken words of the track with the n topics, thereby generating a plurality of n-dimensional lyrics vectors;
receiving a seed track from among the plurality of tracks;
calculating a similarity score for each of the plurality of tracks to the seed track, based on their respective n-dimensional lyrics vectors, thereby generating a plurality of similarity scores;
predicting, based on the n-dimensional lyrics vectors, a set of track tags for each of the plurality of tracks;
identifying one or more similar track tags from among the set of track tags for each of the plurality of tracks;
obtaining, for each track of the plurality of tracks, track metadata including: (i) at least one tag based on a playlist title, (ii) a title, (iii) an album identifier, (iv) an artist name, (v) a value representing popularity, (vi) a plurality of audio features, (vii) one or more genres, (viii) a sentiment score, or (ix) any combination of (i), (ii), (iii), (iv), (v), (vi), (vii) and (viii); and generating a playlist of tracks based on the plurality of similarity scores and the one or more similar track tags.

19. The system according to claim 18, wherein the one or more processors, when executing the executable instructions, further perform:
displaying the track metadata for at least one of the plurality of tracks.

20. The system according to claim 18, wherein extracting n topics summarizing the spoken words of the plurality of tracks comprises using a generative statistical model; and
the generative statistical model is a Latent Dirichlet Allocation (LDA) model.

21. The system according to claim 18, wherein calculating a similarity score includes calculating a cosine distance.

22. The system according to claim 18, wherein the one or more processors, when executing the executable instructions, further perform:
processing the spoken words of the plurality of tracks, wherein the processing includes: (i) white-space standardizing, (ii) lowercasing, (iii) removing stopwords, (iv) removing punctuation, (v) lemmatizing, (vi) removing character repetition based on a dictionary, or (vii) any combination of (i), (ii), (iii), (iv), (v), and (vi).

23. The system according to claim 18, wherein the one or more processors, when executing the executable instructions, further perform:
receiving, for at least one of the plurality of tracks, a seed track lyrics vector; and
wherein calculating the similarity score for at least one of the plurality of tracks further includes calculating the similarity between the lyrics vector of the seed track and the lyrics vector of at least one of the plurality of tracks.

24. The system according to claim 23, wherein calculating a similarity score further includes comparing a hybrid vector of at least one of the plurality of tracks to a hybrid vector of the seed track.

25. A non-transitory computer-readable medium having stored thereon one or more sequences of instructions for causing one or more processors to perform:
receiving a plurality of tracks at an information storage and retrieval platform via an electronic communication from a datastore of tracks, the plurality of tracks including spoken words;
extracting n topics summarizing the spoken words of the plurality of tracks, each topic consisting of a plurality of words found together within the spoken words of the plurality of tracks, where n is an integer;
generating, for each of the plurality of tracks, an n-dimensional lyrics vector using a generative statistical model based on the association of the spoken words of the track with the n topics, thereby generating a plurality of n-dimensional lyrics vectors;
receiving a seed track from among the plurality of tracks;
receiving, for at least one of the plurality of tracks, a seed track lyrics vector;
calculating a similarity score for each of the plurality of tracks to the seed track, based on their respective n-dimensional lyrics vectors, thereby generating a plurality of similarity scores, wherein calculating the similarity score for at least one of the plurality of tracks further includes calculating the similarity between the lyrics vector of the seed track and the lyrics vector of at least one of the plurality of tracks;
predicting, based on the n-dimensional lyrics vectors, a set of track tags for each of the plurality of tracks;
identifying one or more similar track tags from among the set of track tags for each of the plurality of tracks; and
generating a playlist of tracks based on the plurality of similarity scores and the one or more similar track tags.

26. The non-transitory computer-readable medium of claim 25, wherein extracting n topics summarizing the spoken words of the plurality of tracks comprises using a generative statistical model; and
the generative statistical model is a Latent Dirichlet Allocation (LDA) model.

27. The non-transitory computer-readable medium of claim 25, wherein calculating a similarity score includes calculating a cosine distance.

28. The non-transitory computer-readable medium of claim 25, having stored thereon one or more sequences of instructions for causing one or more processors to further perform:
processing the spoken words of the plurality of tracks, wherein the processing includes: (i) white-space standardizing, (ii) lowercasing, (iii) removing stopwords, (iv) removing punctuation, (v) lemmatizing, (vi) removing character repetition based on a dictionary, or (vii) any combination of (i), (ii), (iii), (iv), (v), and (vi).

29. The non-transitory computer-readable medium of claim 25, wherein calculating a similarity score further includes comparing a hybrid vector of at least one of the plurality of tracks to a hybrid vector of the seed track.

30. A non-transitory computer-readable medium having stored thereon one or more sequences of instructions for causing one or more processors to perform:
receiving a plurality of tracks at an information storage and retrieval platform via an electronic communication from a datastore of tracks, the plurality of tracks including spoken words;
extracting n topics summarizing the spoken words of the plurality of tracks, each topic consisting of a plurality of words found together within the spoken words of the plurality of tracks, where n is an integer;
generating, for each of the plurality of tracks, an n-dimensional lyrics vector using a generative statistical model based on the association of the spoken words of the track with the n topics, thereby generating a plurality of n-dimensional lyrics vectors;
receiving a seed track from among the plurality of tracks;
calculating a similarity score for each of the plurality of tracks to the seed track, based on their respective n-dimensional lyrics vectors, thereby generating a plurality of similarity scores;
predicting, based on the n-dimensional lyrics vectors, a set of track tags for each of the plurality of tracks;
identifying one or more similar track tags from among the set of track tags for each of the plurality of tracks;
obtaining, for each track of the plurality of tracks, track metadata including: (i) at least one tag based on a playlist title, (ii) a title, (iii) an album identifier, (iv) an artist name, (v) a value representing popularity, (vi) a plurality of audio features, (vii) one or more genres, (viii) a sentiment score, or (ix) any combination of (i), (ii), (iii), (iv), (v), (vi), (vii) and (viii); and
generating a playlist of tracks based on the plurality of similarity scores and the one or more similar track tags.

31. The non-transitory computer-readable medium of claim 30, having stored thereon one or more sequences of instructions for causing one or more processors to further perform:
displaying the track metadata for at least one of the plurality of tracks.

32. The non-transitory computer-readable medium of claim 30, wherein extracting n topics summarizing the spoken words of the plurality of tracks comprises using a generative statistical model; and the generative statistical model is a Latent Dirichlet Allocation (LDA) model.

33. The non-transitory computer-readable medium of claim 30, wherein calculating a similarity score includes calculating a cosine distance.

34. The non-transitory computer-readable medium of claim 30, having stored thereon one or more sequences of instructions for causing one or more processors to further perform:

processing the spoken words of the plurality of tracks, wherein the processing includes: (i) white-space standardizing, (ii) lowercasing, (iii) removing stopwords, (iv) removing punctuation, (v) lemmatizing, (vi) removing character repetition based on a dictionary, or (vii) any combination of (i), (ii), (iii), (iv), (v), and (vi).

35. The non-transitory computer-readable medium of claim 30, having stored thereon one or more sequences of instructions for causing one or more processors to further perform:

receiving, for at least one of the plurality of tracks, a seed track lyrics vector; and wherein calculating the similarity score for at least one of the plurality of tracks further includes calculating the similarity between the lyrics vector of the seed track and the lyrics vector of at least one of the plurality of tracks.

36. The non-transitory computer-readable medium of claim 35, wherein calculating a similarity score further includes comparing a hybrid vector of at least one of the plurality of tracks to a hybrid vector of the seed track.

* * * * *